US012673266B2

(12) United States Patent
Ma et al.

(10) Patent No.: US 12,673,266 B2
(45) Date of Patent: Jul. 7, 2026

(54) METHOD AND APPARATUS FOR RENDERING WEATHER IN VIRTUAL ENVIRONMENT, DEVICE, MEDIUM AND PROGRAM

(71) Applicant: Tencent Technology (Shenzhen) Company Limited, Shenzhen (CN)

(72) Inventors: Xiaofei Ma, Shenzhen (CN); Jiawei Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 406 days.

(21) Appl. No.: 17/965,323

(22) Filed: Oct. 13, 2022

(65) Prior Publication Data

US 2023/0039131 A1 Feb. 9, 2023

Related U.S. Application Data

(63) Continuation of application No. PCT/CN2021/126846, filed on Oct. 27, 2021.

(30) Foreign Application Priority Data

Nov. 16, 2020 (CN) .......................... 202011280349.7

(51) Int. Cl.
*A63F 13/60* (2014.01)
*A63F 13/52* (2014.01)
(Continued)

(52) U.S. Cl.
CPC .............. *A63F 13/60* (2014.09); *A63F 13/52* (2014.09); *G06T 13/60* (2013.01); *A63F 13/822* (2014.09); *A63F 2300/663* (2013.01)

(58) Field of Classification Search
CPC ........ A63F 13/60; A63F 13/52; A63F 13/822; A63F 2300/663; A63F 13/217;
(Continued)

(56) References Cited

U.S. PATENT DOCUMENTS 5,462,275 A * 10/1995 Lowe ...................... A63F 13/65
463/31
5,583,972 A * 12/1996 Miller ..................... G01W 1/06
345/419
(Continued)

FOREIGN PATENT DOCUMENTS

CN 102855654 A 1/2013
CN 108132712 A 6/2018
(Continued)

OTHER PUBLICATIONS

CN 110473279 A Translation (Year: 2019).*
(Continued)

*Primary Examiner* — Jay Trent Liddle
*Assistant Examiner* — Selwa A Alsomairy
(74) *Attorney, Agent, or Firm* — Crowell & Moring LLP

(57) ABSTRACT

This application discloses a method and apparatus for rendering weather in a virtual environment, a device, a medium and a program, belonging to the art of image processing. The method includes the following steps: acquiring at least one weather map of a weather scene in a virtual environment (201); removing a first weather map from the at least one weather map to obtain a remaining second weather map (202); and rendering the weather scene in the virtual environment according to the second weather map (203). This method reduces the frequency of map sampling by reducing the number of weather maps, and improves the performance of a terminal when running an application program supporting the virtual environment.

17 Claims, 14 Drawing Sheets

Terminal 100

(51) Int. Cl.
  *A63F 13/822* (2014.01)
  *G06T 13/60* (2011.01)

(58) Field of Classification Search
  CPC .......... A63F 13/35; A63F 13/65; A63F 13/53; G06T 13/60; G06T 15/00
  See application file for complete search history.

(56) References Cited

U.S. PATENT DOCUMENTS

| | | | | |
|---|---|---|---|---|
| 5,825,998 | A * | 10/1998 | Brechner | G06T 17/00 |
| | | | | 345/589 |
| 6,313,838 | B1 * | 11/2001 | Deering | G06T 15/00 |
| | | | | 345/428 |
| 2003/0117398 | A1 * | 6/2003 | Hubrecht | G06T 17/20 |
| | | | | 345/423 |
| 2005/0187741 | A1 * | 8/2005 | Gilbert | A63F 13/10 |
| | | | | 703/2 |
| 2005/0202877 | A1 * | 9/2005 | Uhlir | A63F 13/52 |
| | | | | 463/43 |
| 2014/0176558 | A1 * | 6/2014 | Lynn | G16H 40/63 |
| | | | | 345/473 |
| 2017/0287196 | A1 * | 10/2017 | Raeburn | G06T 15/506 |
| 2018/0197323 | A1 * | 7/2018 | Howson | G06T 15/80 |
| 2020/0327711 | A1 | 10/2020 | Walker | |

FOREIGN PATENT DOCUMENTS

| | | | | | |
|---|---|---|---|---|---|
| CN | 110473279 | A | * | 11/2019 | G06T 15/005 |
| CN | 112263837 | A | | 1/2021 | |

OTHER PUBLICATIONS

International Search Report and Written Opinion for PCT/CN2021/126846 mailed Feb. 9, 2022 including translation of International Search Report and Written Opinion (15 pages).

* cited by examiner

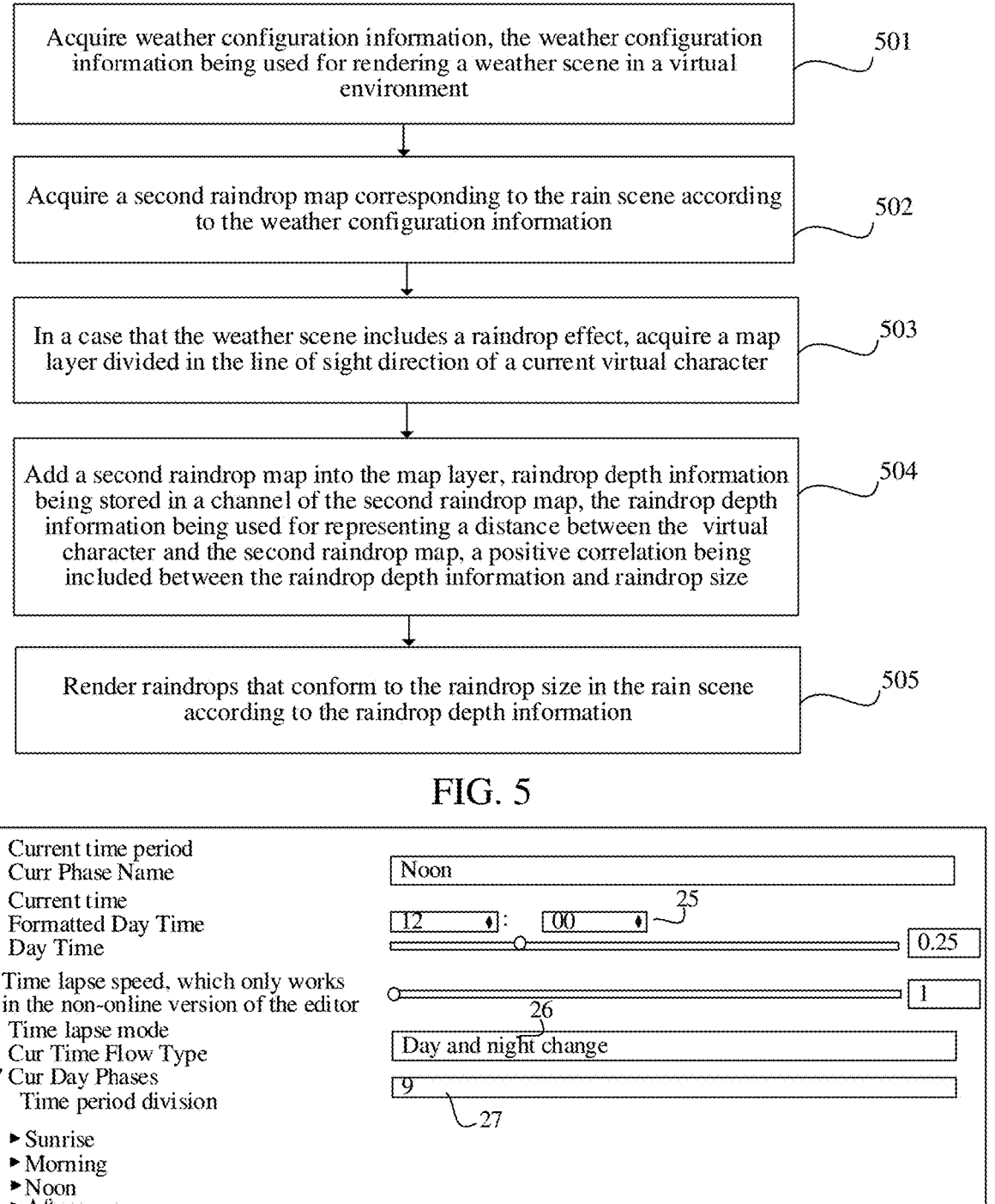

Acquire weather configuration information, the weather configuration information being used for rendering a weather scene in a virtual environment — 501

Acquire a second raindrop map corresponding to the rain scene according to the weather configuration information — 502

In a case that the weather scene includes a raindrop effect, acquire a map layer divided in the line of sight direction of a current virtual character — 503

Add a second raindrop map into the map layer, raindrop depth information being stored in a channel of the second raindrop map, the raindrop depth information being used for representing a distance between the virtual character and the second raindrop map, a positive correlation being included between the raindrop depth information and raindrop size — 504

Render raindrops that conform to the raindrop size in the rain scene according to the raindrop depth information — 505

FIG. 5

Current time period
Curr Phase Name    Noon

Current time
Formatted Day Time   12 : 00 ~25
Day Time               0.25

Time lapse speed, which only works in the non-online version of the editor      1
Time lapse mode
Cur Time Flow Type    26
▾ Cur Day Phases    Day and night change
 Time period division   9
         27

► Sunrise
 ► Morning
 ► Noon
 ► Afternoon
 ► Night
 ► Late at night

FIG. 6

Figure 7:
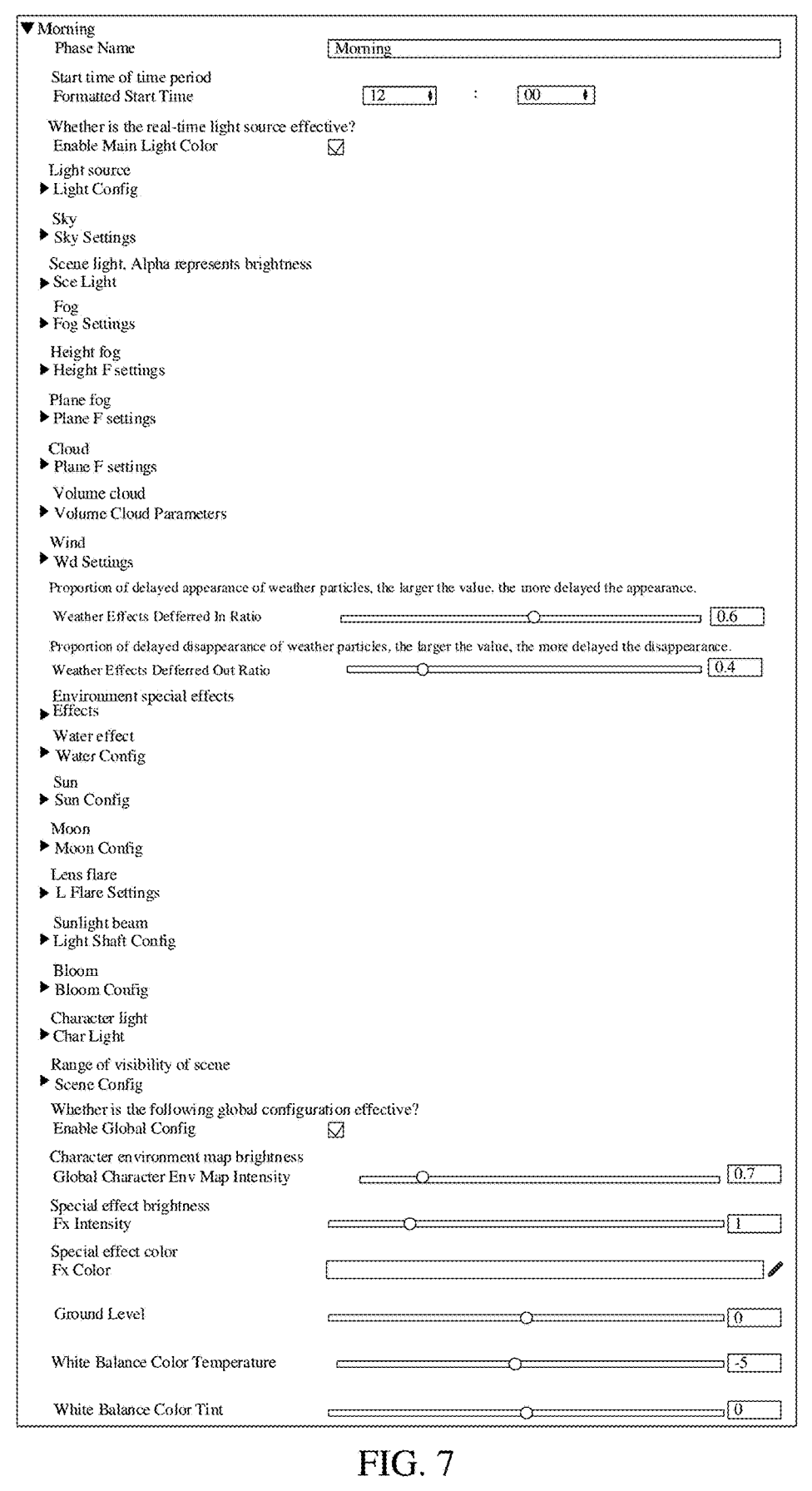

▼Morning
    Phase Name                         `Morning`

Start time of time period
    Formatted Start Time          `12  ↕`   :   `00  ↕`

Whether is the real-time light source effective?
    Enable Main Light Color    ☑

Light source
  ▶ Light Config

Sky
  ▶ Sky Settings

Scene light, Alpha represents brightness
  ▶ Sce Light

Fog
  ▶ Fog Settings

Height fog
  ▶ Height F settings

Plane fog
  ▶ Plane F settings

Cloud
  ▶ Plane F settings

Volume cloud
  ▶ Volume Cloud Parameters

Wind
  ▶ Wd Settings

Proportion of delayed appearance of weather particles, the larger the value, the more delayed the appearance.

Weather Effects Defferred In Ratio    ═══════════○═════════ `0.6`

Proportion of delayed disappearance of weather particles, the larger the value, the more delayed the disappearance.
    Weather Effects Defferred Out Ratio    ═══○══════════════ `0.4`

Environment special effects
  ▶ Effects

Water effect
  ▶ Water Config

Sun
  ▶ Sun Config

Moon
  ▶ Moon Config

Lens flare
  ▶ L Flare Settings

Sunlight beam
  ▶ Light Shaft Config

Bloom
  ▶ Bloom Config

Character light
  ▶ Char Light

Range of visibility of scene
  ▶ Scene Config

Whether is the following global configuration effective?
    Enable Global Config    ☑

Character environment map brightness
    Global Character Env Map Intensity  ═○══════════════ `0.7`

Special effect brightness
    Fx Intensity  ═○══════════════ `1`

Special effect color
    Fx Color  `_____`✎

Ground Level  ═══════════○═════ `0`

White Balance Color Temperature  ═══════════○═════ `-5`

White Balance Color Tint  ═══════════○═════ `0`

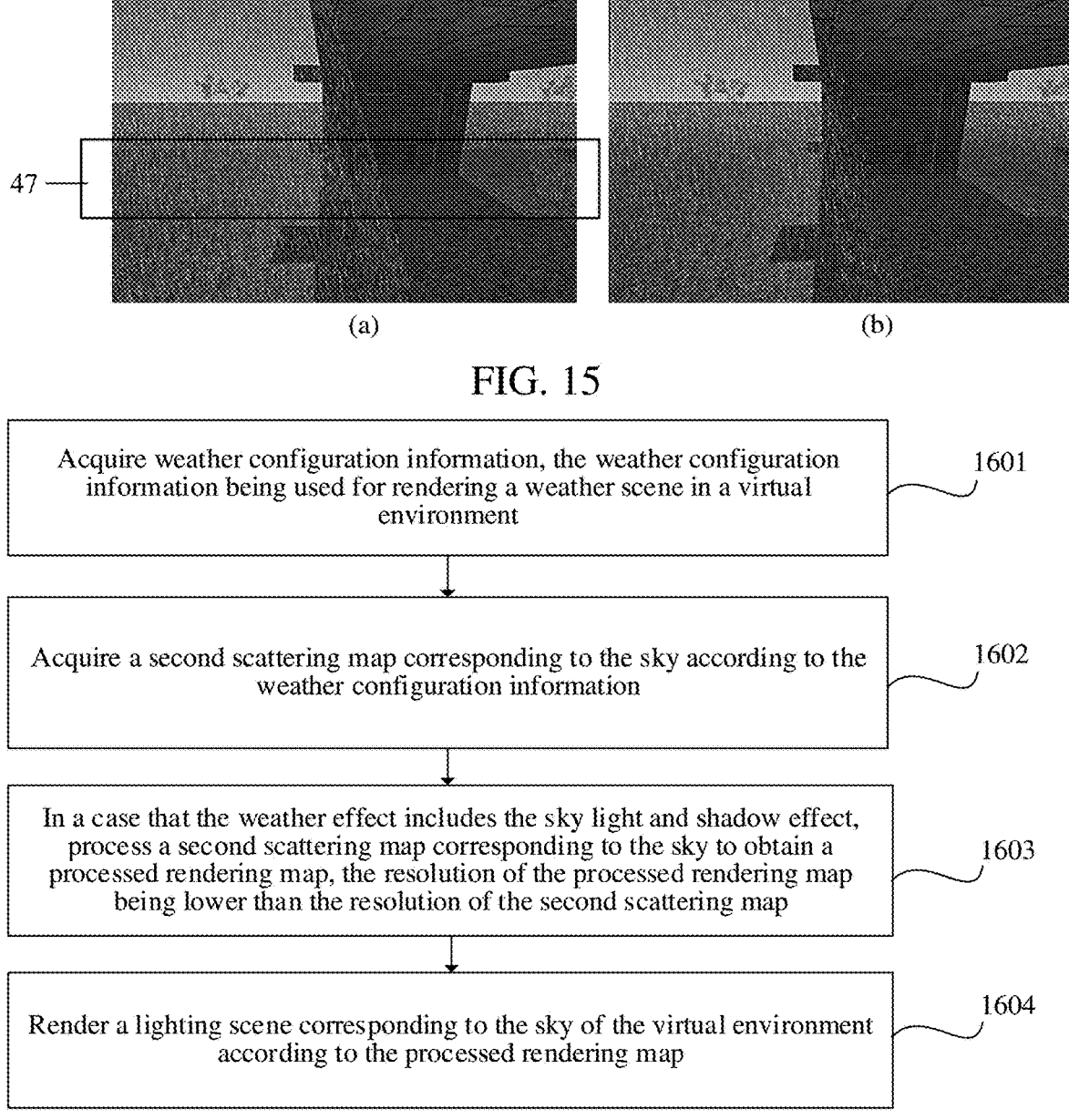

Acquire weather configuration information, the weather configuration
information being used for rendering a weather scene in a virtual
environment　　1601

Acquire a second scattering map corresponding to the sky according to the
weather configuration information　　1602

In a case that the weather effect includes the sky light and shadow effect,
process a second scattering map corresponding to the sky to obtain a
processed rendering map, the resolution of the processed rendering map
being lower than the resolution of the second scattering map　　1603

Render a lighting scene corresponding to the sky of the virtual environment
according to the processed rendering map　　1604

FIG. 16

In a case that the weather scene includes a cloud effect, acquire at least two first texture cloud maps, the first texture cloud maps including two-dimensional cloud images with gray scales, the at least two first texture cloud maps being obtained after pixel points in a reference texture cloud map are offset along different directions, the reference texture cloud map including two-dimensional cloud images under a non-lighting condition     1901

Mix the at least two first texture cloud maps according to weights corresponding to channels of the first texture cloud maps to obtain a second texture cloud map     1902

Render clouds under changing light according to the second texture cloud map     1903

FIG. 19

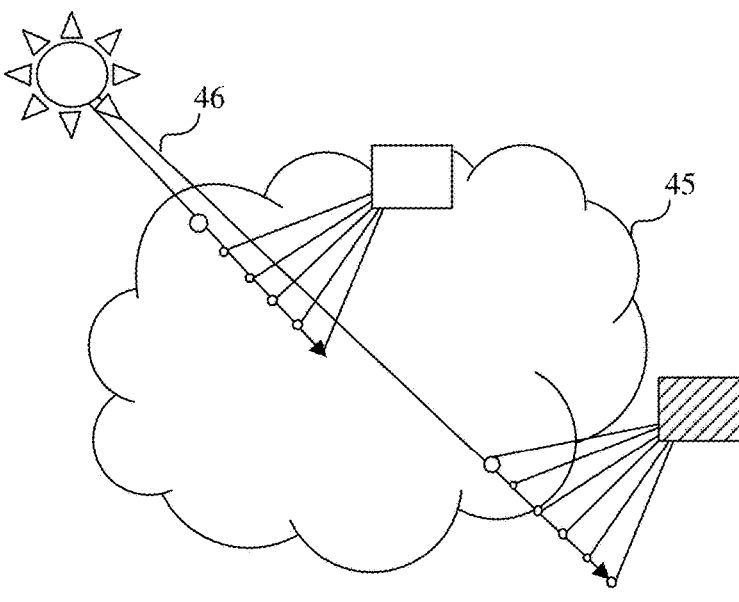

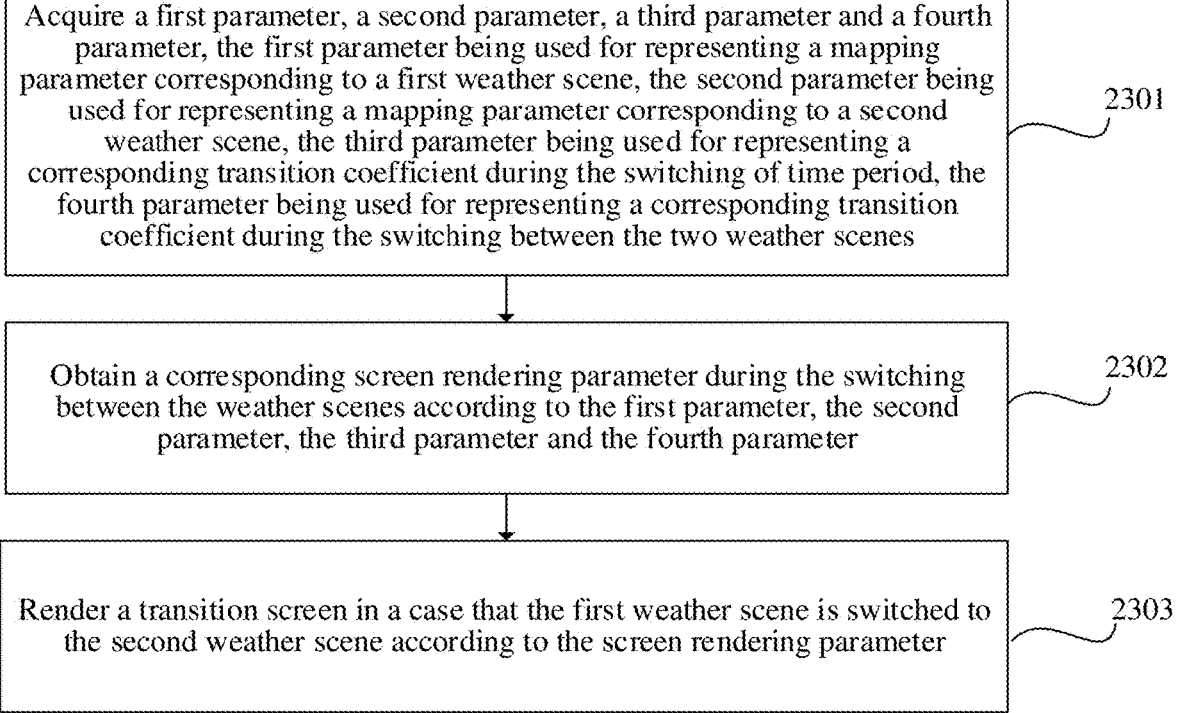

Acquire a first parameter, a second parameter, a third parameter and a fourth parameter, the first parameter being used for representing a mapping parameter corresponding to a first weather scene, the second parameter being used for representing a mapping parameter corresponding to a second weather scene, the third parameter being used for representing a corresponding transition coefficient during the switching of time period, the fourth parameter being used for representing a corresponding transition coefficient during the switching between the two weather scenes — 2301

Obtain a corresponding screen rendering parameter during the switching between the weather scenes according to the first parameter, the second parameter, the third parameter and the fourth parameter — 2302

Render a transition screen in a case that the first weather scene is switched to the second weather scene according to the screen rendering parameter — 2303

FIG. 23

METHOD AND APPARATUS FOR RENDERING WEATHER IN VIRTUAL ENVIRONMENT, DEVICE, MEDIUM AND PROGRAM

RELATED APPLICATION

This application is a continuation of International Application No. PCT/CN2021/126846, filed Oct. 27, 2021, which claims priority to Chinese Patent Application No. 202011280349.7, entitled "METHOD AND APPARATUS FOR RENDERING WEATHER IN VIRTUAL ENVIRONMENT, DEVICE AND STORAGE MEDIUM", and filed on Nov. 16, 2020. The contents of International Application No. PCT/CN2021/126846 and Chinese Patent Application No. 202011280349.7 are incorporated herein by reference in their entirety.

FIELD OF THE TECHNOLOGY

This application relates to the art of image processing, and in particular to a method and apparatus for rendering weather in a virtual environment, a device, a medium and a program.

BACKGROUND OF THE DISCLOSURE

In the application programs of three-dimensional virtual environment, such as massively multiplayer online role-playing games, the weather in the real world is simulated and presented, so that users can have a more realistic experience when controlling virtual characters to play the game.

A weather scene of raining is taken as an example. When rendering a rain scene, the raindrop sizes on each raindrop map are different. It is necessary to add multiple raindrop maps in front of the field of view of the virtual character in a certain order to simulate the rain scene in the real world.

SUMMARY

The embodiments of this application provide a method and apparatus for rendering weather in a virtual environment, a device, a medium and a program. The technical solutions are as follows:

According to an aspect of this application, this application provides a method for rendering weather in a virtual environment, applied to a computer device, the method including:

acquiring at least one weather map of a weather scene in the virtual environment;

removing a first weather map from the at least one weather map to obtain a remaining second weather map; the first weather map including a weather map outside the field of view of a current virtual character in the virtual environment; and rendering the weather scene according to the second weather map.

According to another aspect of this application, this application provides an apparatus for rendering weather in a virtual environment, the apparatus including:

an acquisition module, configured to acquire at least one weather map of a weather scene in the virtual environment;

a processing module, configured to remove a first weather map from the at least one weather map to obtain a remaining second weather map; the first weather map including a weather map outside the field of view of a current virtual character in the virtual environment; and a rendering module, configured to render the weather scene according to the second weather map.

According to another aspect of the embodiments of this application, a computer device is provided, including: a processor and a memory, the memory storing at least one instruction, at least one program, and a code set or an instruction set, the at least one instruction, the at least one program, and the code set or the instruction set being loaded and executed by the processor to implement the method for rendering weather in a virtual environment according to the foregoing aspects.

According to another aspect of this application, a computer-readable storage medium is provided, storing a computer program, and the computer program being loaded and executed by a processor to implement the method for rendering weather in a virtual environment according to the foregoing aspects.

According to another aspect of this application, a computer program product or a computer program is provided, the computer program product or the computer program including computer instructions, the computer instructions being stored in a computer-readable storage medium. A processor of the computer device reads the computer instructions from the computer-readable storage medium and executes the computer instructions to cause the computer device to perform the method for rendering weather in a virtual environment described in the foregoing aspects.

The technical solutions provided in the embodiments of this application include at least the following beneficial effects:

After at least one weather map of the weather scene in the virtual environment is acquired, the first weather map is removed from the at least one weather map, the first weather map is a weather map outside the field of view of the current virtual character in the virtual environment, and the absence of this weather map does not affect the rendering of the weather scene in the field of view of the current virtual character, nor the rendering of the overall virtual environment. Thus, in event that the computer device used by the user loads the virtual environment screen, the normal display of the weather scene is ensured and the number of times of map sampling can be reduced by reducing the number of weather maps, thus preventing the performance from being greatly reduced when the computer device runs application programs supporting the virtual environment.

BRIEF DESCRIPTION OF THE DRAWINGS

FIG. 5 is a flowchart of a method for rendering weather in a virtual environment according to another exemplary embodiment of this application.

FIG. 6 is a schematic diagram of a setting interface of a weather configuration parameter according to an exemplary embodiment of this application.

FIG. 7 is a schematic diagram of a setting interface of a weather configuration parameter according to another exemplary embodiment of this application.

FIG. 15 is a screen diagram of a rain scene corresponding to a virtual environment screen according to another exemplary embodiment of this application.

FIG. 16 is a flowchart of a method for rendering weather in a virtual environment according to another exemplary embodiment of this application.

FIG. 19 is a flowchart of a method for rendering weather in a virtual environment according to another exemplary embodiment of this application.

FIG. 20 is a schematic diagram of rendering of a texture cloud map according to an exemplary embodiment of this application.

FIG. 23 is a flowchart of a method for rendering weather in a virtual environment according to another exemplary embodiment of this application.

DESCRIPTION OF EMBODIMENTS

Figure 1:
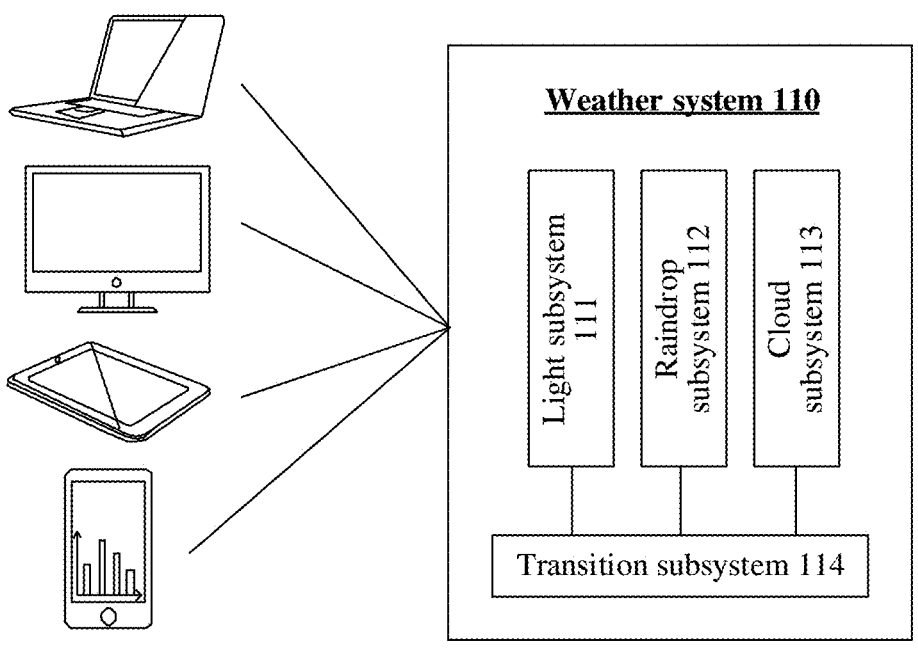
FIG. 1 is a block diagram of a terminal according to an exemplary embodiment of this application.

First, terms involved in the embodiments of this application are introduced as follows:

Virtual environment is displayed (or provided) when an application runs on a terminal. The virtual environment may be a simulated environment of a real world, or may be a semi-simulated and semi-fictional environment, or may be a completely fictional environment. The virtual environment may be any one of a two-dimensional virtual environment, a 2.5-dimensional virtual environment, and a 3D virtual environment. This is not limited in this application. A description is made by using an example in which the virtual environment is a three-dimensional virtual environment in the following embodiments.

A virtual character is a movable object in a virtual scene. The movable object may be a virtual character, a virtual animal, a cartoon character, or the like, for example, a character, an animal, a plant, an oil drum, a wall, or a stone displayed in a 3D virtual scene. Optionally, the virtual character is a three-dimensional model created based on a skeletal animation technology. Each virtual character has a shape and a volume in the three-dimensional virtual scene, and occupies some space in the three-dimensional virtual scene. The virtual character generally refers to one or more virtual characters in a virtual scene. Taking a game application program as an example, a virtual character is a movable object controlled by a user when participating in a game.

Massive Multiplayer Online Role-Playing Game (MMORPG) refers to a network game that supports multiplayer online. Different clients can play in the same scene, can cooperate to complete a task, and can communicate online. The client can also interact with a Non-Player Character (NPC) in the game. Generally, the user controls the virtual character by logging in the user account at the client. The virtual character corresponds to the user account (ID) one to one. The user controlled virtual characters play different roles in the virtual environment, such as general role, wizard role, scholar role and dancer role. Massive multiplayer online games include strategy, action, adventure, simulation, sports, car racing, role-playing and other games. The following embodiments will be described by taking that the client is a game client as an example.

A method provided by this application can be applied to three-dimensional map programs, simulation programs, First-Person Shooting (FPS) games, Multiplayer Online Battle Arena (MOBA) games, MMOPRG games, Virtual Reality (VR) application programs, Augmented Reality (AR) application programs, etc. The following embodiments will be described by taking a game application program as an example.

A game based on a virtual environment usually includes maps of one or more game worlds. The virtual environment in the game simulates the environment in the real world. The user may control a virtual character in the game to perform actions in the virtual environment such as walking, running, jumping, shooting, combating, driving, being attached by other virtual characters (which are virtual characters controlled by other users), being hurt in the virtual environment, and attacking other virtual characters. The interactivity is high. In addition, multiple users may form a team online to play competitive games.

Exemplarily, the virtual environment corresponds to changing weather, such as sunny days, rainy days, snowy days, sandstorms, thunderstorms, rainstorms, and blizzards. Like the real world, the virtual environment is divided into various time periods, and each time period corresponds to different light and shadow effects. For example, 6:00 to 7:00 AM is the time of sunrise, the virtual environment corresponds to the light of sunrise, and 4:00 to 5:00 PM is the time of sunset, and the virtual environment corresponds to the light of twilight.

The embodiment of this application provides a method for rendering weather in a virtual environment. In the method, a first weather map of at least one weather map of the weather scene is removed. The absence of the first weather map does not affect the rendering of the weather scene in the field of view of a current virtual character. Therefore, the number of times of map sampling can be reduced when a terminal runs a game application program, and the performance of the terminal can be prevented from being reduced.

FIG. 1 illustrates a block diagram of a terminal according to an exemplary embodiment of this application. The method for rendering weather in the virtual environment according to the embodiment of this application is applied to a terminal 100, and the terminal 100 is installed with a client corresponding to an application program that supports virtual scene operation. The application program includes a three-dimensional map program, a simulation program, an FPS game application program, an MOBA game application program, an MMOPRG game application program, a VR application program, and an AR application program. The following embodiments will be described by taking that the application program is a game application program as an example.

In some embodiments, the terminal includes at least one of a smart phone, a tablet computer, an MP3 player, an MP4 player, a laptop computer, a desktop computer, and a notebook computer. The following embodiments will be described by taking that the terminal is a smart phone as an example.

Taking that the client is a client for a game application program (hereinafter referred to as game client) as an example, the client corresponds to a weather system 110, including a sky light and shadow subsystem 111, a raindrop subsystem 112, a cloud subsystem 113 and a transition subsystem 114.

The sky light and shadow subsystem 111 is configured to simulate various lighting scenes in the virtual environment, such as the lighting scene at sunrise, the lighting scene at dusk, and the lighting scene of the moon at night. The sky light and shadow subsystem 111 calculates a scattering map corresponding to the sky of the virtual environment according to weather configuration information, stores the scattering map off line, and loads the lighting scene in the virtual environment directly by acquiring the scattering map when the game client runs. The scattering map does not include a first scattering map of a virtual element in the spatial dimension, that is, it does not include a first scattering map at a sky height higher than a specified height. Map sampling refers to a process that a Graphics Processing Unit (GPU) of the terminal accesses (acquires) maps to load weather scenes during the operation of the game client.

Figure 9:
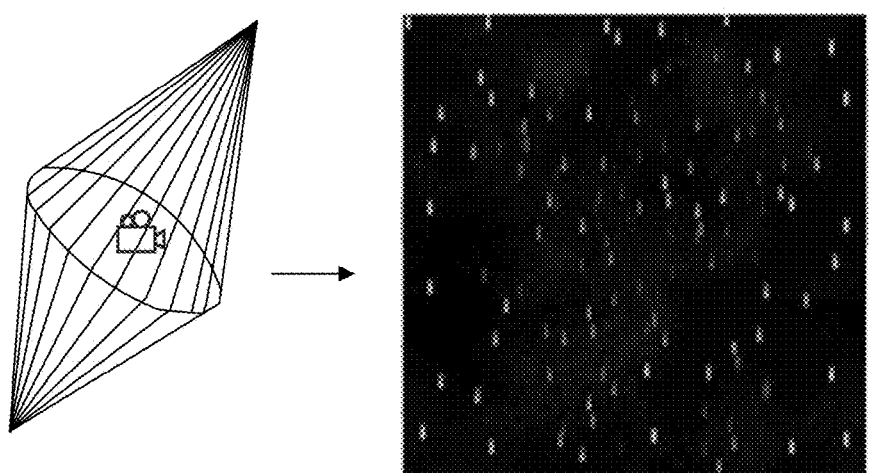
FIG. 9 is a schematic diagram of a simulation effect of a rain scene according to an exemplary embodiment of this application.

The raindrop subsystem 112 is configured to simulate various rain scenes in the virtual environment, such as at least one of a light rain scene, a heavy rain scene, a torrential rain scene, and a thunderstorm scene. The raindrop subsystem 112 calculates a raindrop map according to the weather configuration information. In event that the virtual environment is in the rain scene, the rain scene is simulated by constructing a biconical model as illustrated in FIG. 9. The biconical model bounds a camera model bound to a virtual character. The raindrop map is attached to a surface of the biconical model. In event that the angle of the biconical model is constantly changing, the angle between the raindrop map and the camera model is also constantly changing, so the screen with raindrops captured by the camera model is also changing. The raindrop subsystem 112 divides the visual angle range of the virtual character along the line of sight to obtain a preset number of map layers, and adds a raindrop map with a preset number of map layers according to the positions of the map layers, that is, attaches a raindrop map with a preset number of layers onto the surface of the biconical model. Raindrop depth information is stored in a B channel of the raindrop map, and the B channel is a B channel in a red (R) green (G) blue (B) color mode. The raindrop depth information is used for characterizing the distance between the virtual character (or the camera model bound to the virtual character) and the raindrop map. The raindrop map with different raindrop depth information simulates the rain scene according to the parallax principle, that is, the raindrop size close to the virtual character is larger, and the raindrop size far from the virtual character is smaller.

The raindrop subsystem 112 is further configured to update the position of water spray. The water spray is used for characterizing water spray generated when raindrops splash on the ground of the virtual environment. By associating the position of the water spray with the camera model corresponding to the virtual character, in event that the camera model moves, the water spray will follow the camera model. By offsetting the position of the water spray in the virtual environment to simulate the continuous water spray on the ground when it rains, the terminal does not need to generate the water spray repeatedly, thus improving the performance of the terminal when running the game client.

The raindrop subsystem 112 is further configured to generate a particle distribution box for the virtual character. The particle distribution box bounds the virtual character and is divided into m*n sub distribution boxes, m and m are positive integers and may be equal or unequal, and each sub distribution box corresponds to a particle emitter. In event that the virtual character moves to the edge position of a bounding range corresponding to the particle distribution box, a layer of sub distribution box farthest from the current virtual character moves along the moving direction of the virtual character to a position in front of and adjacent to the nearest layer of sub distribution box. The nearest layer of sub distribution box is located in front of the field of view of the current virtual character and has the shortest distance from the current virtual character. Due to the movement of the sub distribution boxes, the virtual character is always located in the particle distribution box, that is, the virtual character is always covered by raindrops. Exemplarily, the particle distribution box is further configured to simulate a snow scene, a hail scene, a sandstorm scene and other weather scenes that need to be represented by particles.

The cloud subsystem 113 is configured to preprocess a two-dimensional cloud image. The two-dimensional cloud image is a gray-scale image with a cloud contour under a non-lighting condition. Preprocessing refers to the processing of the two-dimensional cloud image through a ray marching algorithm. That is, it is an image obtained after pixel points in the two-dimensional cloud image are moved in a certain direction according to a preset step size. At least two texture cloud maps after preprocessing are mixed according to weights corresponding to the channels of the texture cloud maps, so as to obtain a cloud map used for loading the virtual scene. The terminal does not need to repeat map sampling to load the virtual environment image.

The transition subsystem 114 is configured to calculate a screen rendering parameter of the virtual environment when the weather scene is switched, and render a transition screen during switching between the two weather scenes according to the screen rendering parameter.

Figure 2:
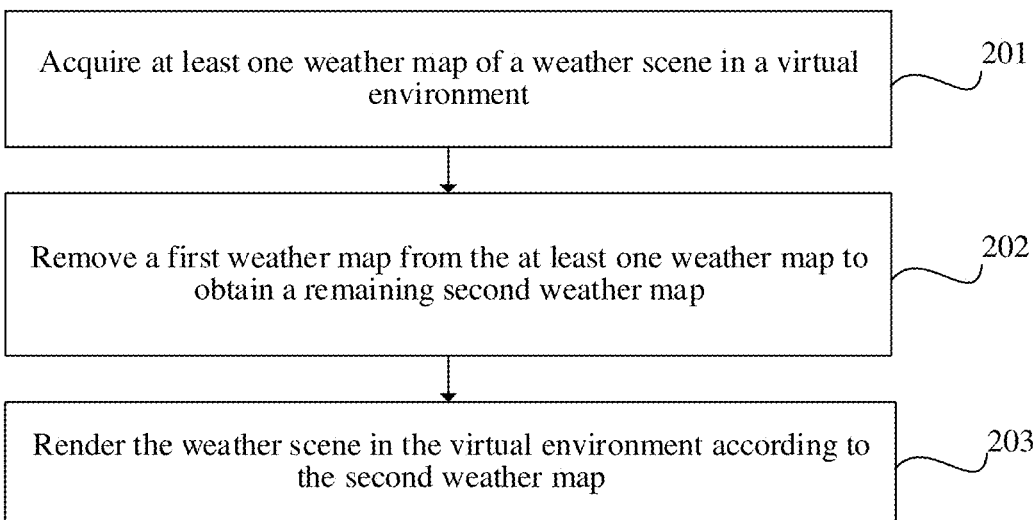
FIG. 2 is a flowchart of a method for rendering weather in a virtual environment according to an exemplary embodiment of this application.

FIG. 2 illustrates a flowchart of a method for rendering weather in a virtual environment according to an exemplary embodiment of this application. The method can be applied to the terminal 100 illustrated in FIG. 1. The terminal 100 is installed with a client corresponding to an application program that supports the operation of the virtual environment, and the client runs based on the weather system 110. The method includes the following steps:

Step 201, acquire at least one weather map of a weather scene in the virtual environment.

The acquisition of the weather map may be implemented by the following steps:

1) The terminal acquires weather configuration information. The weather configuration information is used for rendering the weather scene in the virtual environment.

Exemplarily, the weather configuration information may be used for rendering the weather scene in the initial virtual environment, and may also be used for rendering the weather scene during the switching of the weather scene in the virtual environment.

Exemplarily, the terminal used by the user is installed with and runs an application program that supports virtual scene operation. In event that the terminal runs the application program, the display screen of the terminal correspondingly displays the screen during the use of the application program. The application program runs based on the weather system. The weather scene is correspondingly displayed on the display screen of the terminal.

Taking the game application as an example, when running the game application, the display screen of the terminal displays the virtual environment screen in the game. Exemplarily, the virtual scene screen is a screen obtained by observing the virtual scene from the first-person perspective of the virtual character, or the virtual scene screen is a screen obtained by observing the virtual scene from the third-person perspective of the virtual character.

Exemplarily, the game application program corresponds to a server. The server sends the weather configuration information to the terminal running the application program. The game application renders the weather scene corresponding to the virtual environment according to the weather configuration information. For example, the weather configuration information is the time of the current virtual environment, the server sends the current time of the virtual environment to the terminal, such as 10:00 AM, and the game application program loads the virtual environment screen according to the weather scene corresponding to 10:00 AM.

Exemplarily, the weather configuration parameter is acquired by obtaining a status parameter from the terminal. For example, the terminal is a smart phone, the current time displayed by the smart phone is 10:00 AM, and the game application program loads the virtual environment screen according to the weather scene corresponding to the current time displayed by the smart phone.

The weather configuration information refers to the configuration information of the weather element in the virtual environment. The weather configuration information includes at least one of a time period of the virtual environment, a time lapse mode of the virtual environment (such as changing between day and night changes or not changing in a time period), a light source parameter, a sky parameter, a fog parameter, a cloud parameter, a wind parameter, a particle parameter (used for representing particles in the weather scene, such as raindrops, snowflakes, and sandstorms), an environment effect parameter (such as influence on the virtual environment when the virtual character releases skills), a water effect parameter, a sun parameter, a moon parameter, and a lens flare (a lens of a camera model moving with the virtual character).

Exemplarily, a weather correspondence is stored in the weather system in advance. The weather correspondence is used for representing the correspondence between the weather configuration information and the weather scenes (including scene effects). It is to be understood that when a technician develops a game application program, a weather correspondence is preset in the weather system and the weather system is encapsulated in the game application program. During the operation of the game application program, the weather scene under the weather configuration information is calculated according to the weather configuration information and the weather correspondence. The weather scene refers to a scene effect presented by the virtual environment in a certain weather scene.

Exemplarily, the weather correspondence includes a functional relationship. For example, the weather configuration information and the weather scenes conform to a function $y=kx+b*e^x$, where k and b are constants, x represents a parameter corresponding to the weather configuration information, and y represents a weather scene.

Exemplarily, the weather correspondence includes a lookup table relationship, and the game application program queries the corresponding weather scene from the lookup table according to the weather configuration information. Table 1 shows a correspondence between the weather configuration information and the weather scenes.

TABLE 1

| Weather configuration information | Weather scene |
| --- | --- |
| 3:00 PM, lighting intensity 0.4 | Lingering light of the setting sun |
| Raindrop particle parameter 10 | Rainstorm |
| Fog density 60% | Dense fog |

The expression of the weather correspondence is not limited in the embodiments of this application.

2) At least one weather map of a weather scene is acquired according to the weather configuration information.

The weather map is a map used for representing the weather scene. There are two types of weather maps, including a first weather map and a second weather map. The first weather map includes a weather map outside the field of view of the current virtual character in the virtual environment. The second weather map includes a weather map inside the field of view of the current virtual character in the virtual environment.

Figure 3:
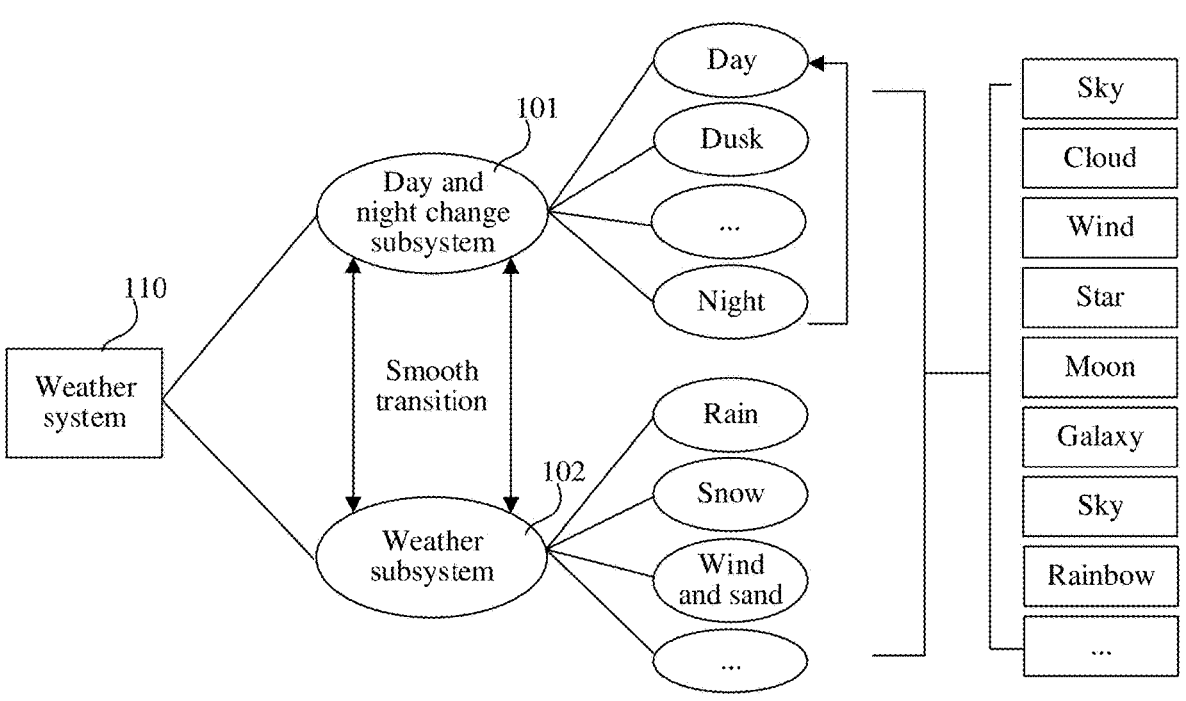
FIG. 3 is a block diagram of a weather system according to an exemplary embodiment of this application.

The weather system 110 is used for at least one of the following aspects: day and night changes in the virtual environment, simulation of weather performance in the real world, and smooth transition between various weather scenes. Referring to FIG. 3, the weather system 110 includes a day and night change subsystem 101 and a weather subsystem 102. The day and night change subsystem 101 is configured to change the scene screen in the virtual environment according to the weather configuration information, for example, from the day scene to the dusk scene, from the dusk scene to the night scene, from the night scene to the day scene, and so on. The weather subsystem 102 is configured to change the weather scene in the virtual environment according to the weather configuration information, for example, change the raindrop size and raindrop density in the virtual environment according to the raindrop parameter; change the light intensity and the light irradiation direction in the virtual environment according to the light source parameter. The day and night change subsystem 101 includes a transition subsystem. The weather subsystem 102 includes a sky light and shadow subsystem, a raindrop subsystem, and a cloud subsystem. It is to be understood that the weather subsystem 102 further includes subsystems such as a wind subsystem and a galaxy subsystem. Each subsystem operates independently. The embodiment of this application will be described by taking the sky light and shadow subsystem, the raindrop subsystem and the cloud subsystem as an example.

In the process of rendering the weather by the weather system, a large number of weather maps representing the weather scenes in multiple dimensions are usually required. The terminal performs map sampling based on the weather configuration information. Map sampling refers to a process that a game application program acquires a weather map from a Graphics Processing Unit (GPU). That is, the game application program draws a weather map of a virtual element in the weather scene according to the weather configuration information through the GPU. The virtual element is an element in the virtual environment and includes at least one of flat land, river, lake, ocean, desert, sky, cloud, raindrop, snowflake, plant, building and vehicle.

Step 202, remove a first weather map from the at least one weather map to obtain a remaining second weather map.

The removal of the first weather map does not affect the rendering of the virtual environment screen. The first weather map includes at least one of the following maps:

1. In event that the weather scene includes a raindrop effect, the first weather map includes a first raindrop map in front of the field of view of the current virtual character and beyond a preset distance of the current virtual character.

Figure 8:
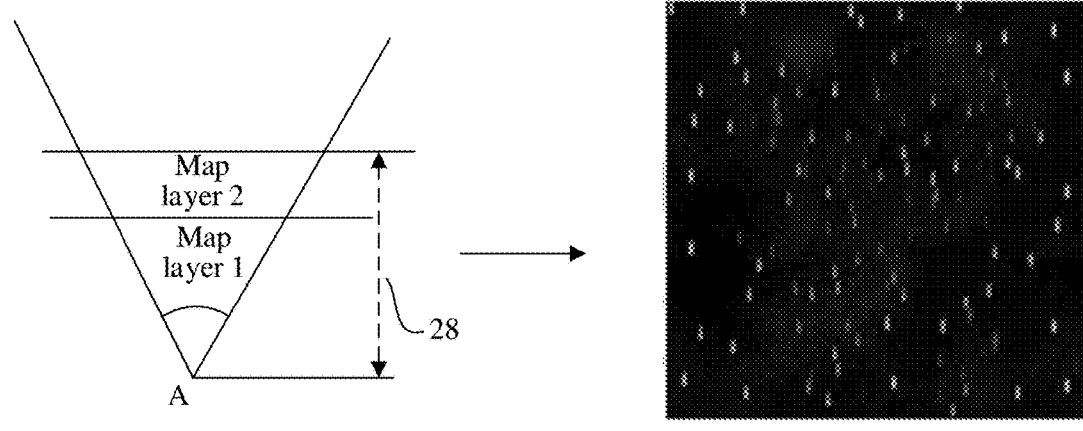
FIG. 8 is a schematic diagram of map layer division according to an exemplary embodiment of this application.

The current virtual character is a virtual character controlled by the client. With the current virtual character as the center, the map layer is divided along the line of sight direction of the current virtual character within the viewing angle range of the current virtual character. Referring to FIG. 8, by adding a raindrop map to the map layer, the user can see the raindrops in front of the field of view of the current virtual character through the camera model bound to the current virtual character. The embodiment of this application reduce the number of raindrop maps by adding the raindrop map with a preset map layers within the preset distance range, thus reducing the number of times of map sampling performed by the terminal and improving the performance of the terminal when running the game application.

2. In event that the weather scene includes a sky light and shadow effect, the first weather map includes a first scattering map at a sky height higher than a specified height. The first scattering map is an image for representing a light scattering effect in the sky.

Figure 4:
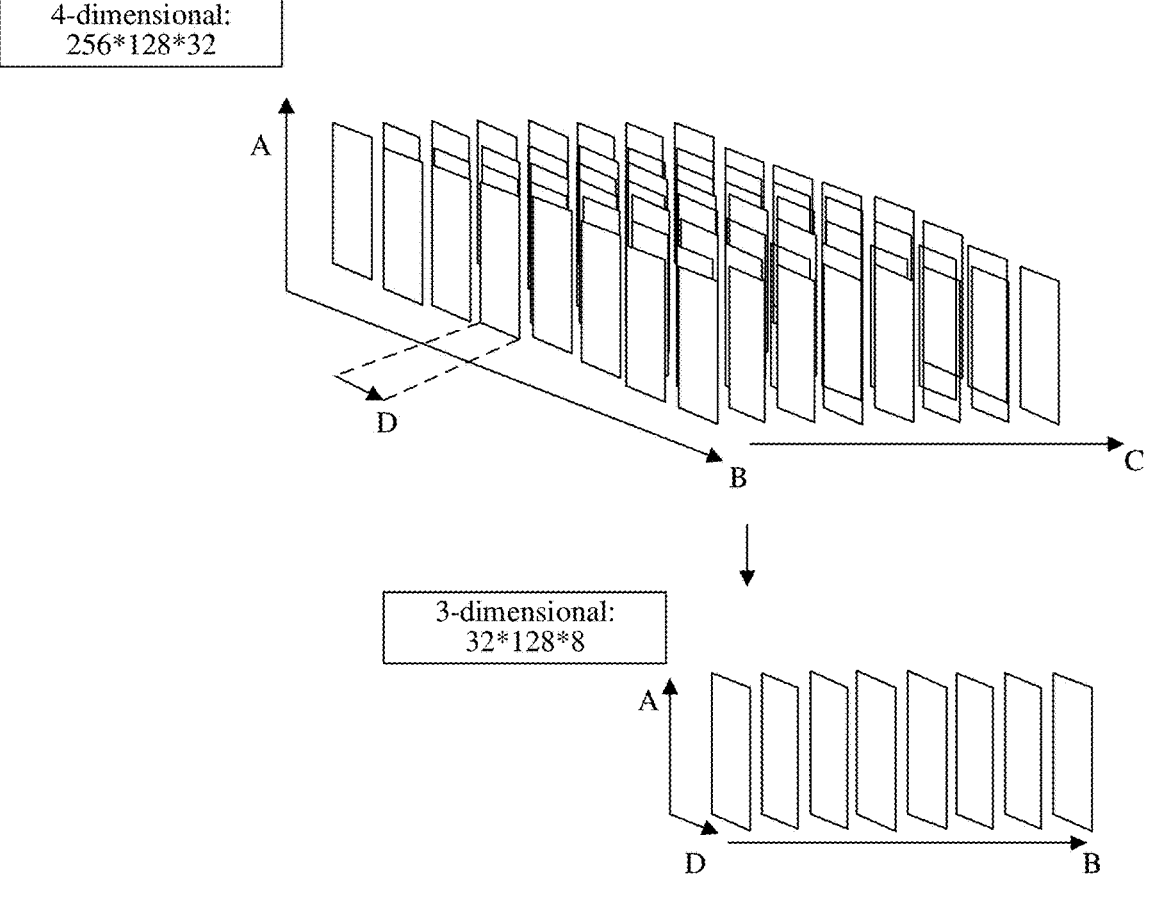
FIG. 4 is a schematic diagram of a scattering map corresponding to a sky according to an exemplary embodiment of this application.

Referring to FIG. 4, the scattering map is represented by a rectangle. Generally, the pixel points in the scattering map corresponding to the sky light and shadow effect include the values of four dimensions. The values of the four dimensions are respectively represented by a coordinate axis A, a coordinate axis B, a coordinate axis C and a coordinate axis D. The coordinate axis A represents the included angle between the line of sight of the virtual character and the highest point of the sun. The highest point of the sun represents the highest point of the sun in the sky. The sky is the sky in the virtual environment. The coordinate axis B represents the included angle between the arbitrary position of the sun in the sky and the highest point of the sun. The coordinate axis C represents the distance of the virtual element in the spatial dimension. In the embodiment of this application, the coordinate axis C is used for representing the distance between the virtual character and the virtual element in the virtual environment on the earth when the virtual character observes the earth in space. The virtual environment formed by the earth and the space is constructed by simulating the planetary environment in the real world. The virtual environment on the earth is the area where the virtual character usually performs activities. The coordinate axis D represents the corresponding included angle between the line of sight of the virtual character and the arbitrary position of the sun in the sky.

The embodiment of this application reduces a part of the scattering maps by removing the value represented by the coordinate axis C, that is, removing the scattering maps at the sky height equal to or higher than the specified height, and reduces the number of scattering maps by taking the coordinate axis A, the coordinate axis D and the coordinate axis B as the three dimensions of the pixel points, thus reducing the number of times of map sampling performed by the terminal and improving the performance of the terminal when running the game application program.

In some embodiments, in event that the weather scene includes a cloud effect, the terminal directly acquires a two-dimensional gray-scale map of the cloud. Therefore, in event that the weather scene includes a cloud effect, the second weather map obtained by the terminal does not include a three-dimensional cloud image with color.

Generally, the game application program uses volume clouds to represent the cloud effect in the virtual environment. The volumetric clouds are composed of three-dimensional cloud images with colors. Therefore, the embodiment of this application realize the cloud effect by using the two-dimensional cloud color images with gray scales without acquiring three-dimensional cloud images with colors, thus reducing the amount of computation of the terminal and improving the performance of the terminal when running the game application program.

Step 203, render the weather scene in the virtual environment according to the second weather map.

Rendering refers to adding a weather map to a target position, so that the target position presents richer details.

Exemplarily, in a rain scene, a raindrop map that does not include the first raindrop map is added in front of the field of view of the virtual character. When the virtual environment screen is observed from the perspective of the virtual character, the virtual environment is in the rain scene.

Exemplarily, in a sunny scene, a scattering map that does not include the first scattering map is attached to a sky sphere model. When the virtual environment screen is observed from the perspective of the virtual character, the sky of the virtual environment presents a sky light and shadow effect corresponding to the sunny scene. The sky sphere model is a hemispherical sky model used for characterizing the virtual environment.

Exemplarily, in the sunny scene, a two-dimensional cloud image with a gray scale is attached onto the sky sphere model. When the virtual environment screen is observed from the perspective of the virtual character, the sky of the virtual environment presents a cloud effect corresponding to the sunny scene.

To sum up, in the method according to this embodiment, after at least one weather map of the weather scene in the virtual environment is acquired, the first weather map is removed from the at least one weather map, the first weather map is a weather map outside the field of view of the current virtual character in the virtual environment, and the absence of this weather map does not affect the rendering of the weather scene in the field of view of the current virtual character, nor the rendering of the overall virtual environment. Thus, when the computer device used by the user loads the virtual environment screen, the normal display of the weather scene is ensured and the number of times of map sampling can be reduced by reducing the number of weather maps, thus preventing the performance from being greatly reduced when the computer device runs application programs supporting the virtual environment.

A method for rendering weather in a virtual environment according to an embodiment of this application will be described by taking a weather scene including a raindrop effect, a sky light and shadow effect and a cloud effect as an example.

1. Raindrop Effect

FIG. 5 illustrates a flowchart of a method for rendering weather in a virtual environment according to another exemplary embodiment of this application. The method can be applied to the terminal 100 illustrated in FIG. 1. The terminal 100 is installed with a client corresponding to an application program that supports the operation of the virtual environment, and the client runs based on the weather system 110. The method includes the following steps:

Step 501, acquire weather configuration information. The weather configuration information is used for rendering the weather scene in the virtual environment.

Exemplarily, the server sends the weather configuration information to the client. The weather configuration information includes that the current time of the virtual environment is 3:00 PM. and the raindrop particle parameter is 10. After the client acquires the weather configuration information, the client acquires a raindrop map related to the rainy day according to the weather correspondence stored in the weather system in advance, and renders the rain scene according to the raindrop map.

The operation of the weather system is related to the weather correspondence set during the development of the game application program. The parameter information involved in the weather configuration information is set through a setting interface.

Referring to FIG. 6, weather configuration parameters and a weather correspondence are set in the setting interface. Exemplarily, in the setting interface, the current time 25 of the virtual environment is manually inputted, or a time adjustment control is clicked to adjust the current time 25 of the virtual environment. By setting the time lapse mode 26, it is set that the time in the virtual environment changes day and night, or the virtual environment operates in a fixed time period. For example, no matter when the terminal runs the game application program, the scene displayed in the virtual environment is a scene corresponding to a time period from 8:00 to 9:00 AM. The scene is unchanged. Exemplarily, the virtual environment, like the real world, is a 24-hour system. 24 hours can be divided into 9 time periods (as illustrated in control 27) through the setting interface. The time lengths corresponding to the time periods are the same or different.

Referring to FIG. 7, a technician may further make more detailed settings. For example, in event that the time period of the virtual environment is morning, the weather configuration parameters of the weather scene at this time period, such as light source parameter, sky light and shadow parameter, fog parameter, cloud parameter, wind parameter and hue parameter at this time period, are set.

Step 502, acquire a second raindrop map corresponding to the rain scene according to the weather configuration information.

The first weather map includes a raindrop map in front of the field of view of the current virtual character and beyond a preset distance of the current virtual character. The second weather map includes a raindrop map in front of the field of view of the current virtual character and within a preset distance of the current virtual character. The first raindrop map does not include the second raindrop map. The terminal calculates a corresponding weather scene according to the weather configuration information, and acquires a second raindrop map according to the weather scene.

Step 503, when the weather scene includes a raindrop effect, acquire a map layer divided in the line of sight direction of the current virtual character.

In event that the weather scene includes a raindrop effect, the terminal acquires a viewing angle range of the current virtual character. The viewing angle range includes map layers divided along the line of sight direction of the virtual character. The number of the map layers is less than or equal to a preset number of layers.

Referring to the left figure of FIG. 8, the position of the virtual character is represented by point A. Exemplarily, the preset number of the map layers is two. Within the viewing angle range of the current virtual character, a map layer 1 and a map layer 2 are divided along the line of sight direction of the current virtual character. The distance 28 between the map layer 2 and the current virtual character is within a preset distance from the current virtual character. Exemplarily, the distance between the map layers is equal. The preset distance controls the number of the map layers to be less than or equal to the preset number of layers. The map layers are used for determining the number of raindrop maps required to render the rain scene. Each map layer corresponds to one raindrop map. In some embodiments, the distances between the map layers may also be unequal.

Step 504, add a second raindrop map into the map layer. Raindrop depth information is stored in a channel of the second raindrop map. The raindrop depth information is used for representing the distance between the current virtual character and the second raindrop map. A positive correlation is included between the raindrop depth information and raindrop size.

In order to simulate the phenomenon of "it seems big from a short distance and small from a long distance" in the real world, raindrop depth information is stored in the B channel of the second raindrop map in advance. A positive correlation is included between the raindrop depth information and the raindrop size. The B channel is a B channel in a red (R) green (G) blue (B) color mode. It can be seen that the sizes of raindrops on the same second raindrop map are different. The second raindrop map generally refers to one or more raindrop maps.

Step 505, render raindrops that conform to the raindrop size in the rain scene according to the raindrop depth information.

The terminal renders raindrops with the raindrop size matching the raindrop depth information in the rain scene. That is, the raindrop size in the rain scene is rendered according to the raindrop depth information stored in the second raindrop map, so that the raindrops closer to the current virtual character present a larger raindrop size, and the raindrops farther from the current virtual character present a smaller raindrop size. Referring to FIG. 8, the sizes of raindrops are different and a parallax effect is presented.

The current virtual character is bound with a camera model. The virtual environment screen observed by the current virtual character is represented by a screen obtained by the camera model by photographing the virtual environment. A biconical model is constructed for the camera model, as illustrated in a left figure of FIG. 9. The biconical model bounds the camera model. The second raindrop map is attached to a surface of the biconical model. When the biconical model swings, the second raindrop map also swings with the biconical model. There is a certain included angle between the camera model and the second raindrop map. In the rain screen captured by the camera model, the raindrops present a certain inclination angle. When the two tips of the biconical model are perpendicular to the horizontal plane, the camera model is perpendicular to the second raindrop map. In the rain screen captured by the camera model, the raindrops fall vertically from top to bottom.

The embodiment of this application adds the camera model corresponding to the current virtual character to the biconical model by constructing the biconical model to simulate the rain scene in the real world. During the operation of the game application program, the camera model and the biconical model are not displayed in the virtual environment screen, that is, the user cannot see the biconical model and the camera model. FIG. 9 is only a schematic diagram.

In sum, in the method according to this embodiment, the depth information is stored in the raindrop map, so that the raindrop map is displayed in the field of view of the virtual character according to the depth information, showing a visual phenomenon of "it seems big from a short distance and small from a long distance", that is, the size of raindrops close to the virtual character is large, and the size of raindrops far away from the virtual character is small, thus truly simulating the scene when it rains in the real world. There is no need to add multiple layers of raindrop maps with different raindrop sizes in front of the field of view of the virtual character (the size of raindrops on one raindrop map is the same), thus reducing the number of raindrop maps, reducing the number of times of map sampling performed by the terminal, and improving the performance of the terminal when running game application programs.

In an exemplary embodiment based on FIG. 5, a particle emitter is usually configured to simulate rain in the virtual environment, and the method for rendering weather in the virtual environment further includes the following steps:

Step 51, when the current virtual character moves to an edge position of a bounding range corresponding to the particle distribution box, acquire a moving direction of the current virtual character.

Figure 10:
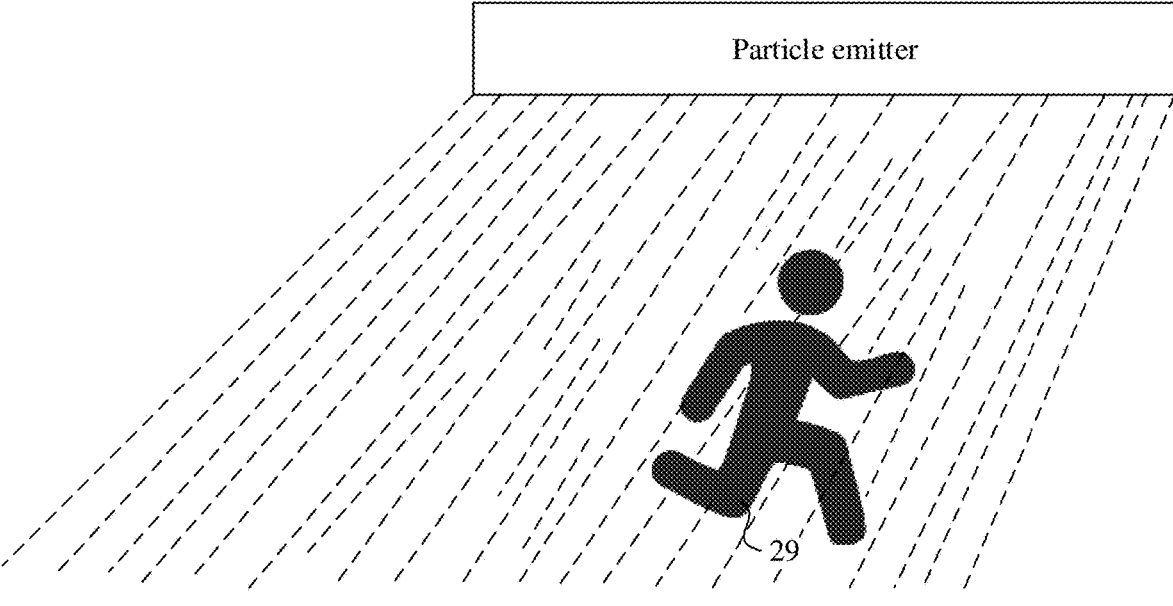
FIG. 10 is a schematic working diagram of a particle emitter according to an exemplary embodiment of this application.

Referring to FIG. 10, when a rain scene is simulated, a particle emitter is usually provided above the current virtual character 29 to realize that the current virtual character 29 is always located in the rain scene.

The virtual character corresponds to a particle distribution box. The particle distribution box is a box-shaped model for emitting particles. The particle distribution box is divided into m*n sub distribution boxes, the virtual character is located in the particle distribution box, m and n are positive integers, and each sub distribution box corresponds to a particle emitter. The particle distribution box is configured to simulate the weather scene represented by particles through particle emitters.

Exemplarily, m and n may be equal or unequal. The particle distribution box is configured to simulate a rain scene, a snow scene, a sandstorm scene, a hail scene and other weather scenes that need to be represented by particles.

Figure 11:
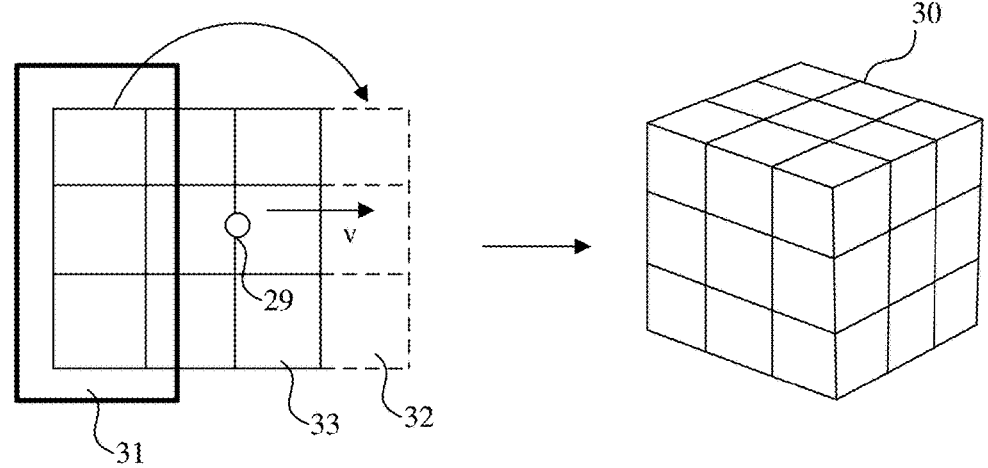
FIG. 11 is a schematic diagram of a particle emitter according to an exemplary embodiment of this application.

Referring to a right figure of FIG. 11, by setting a particle distribution box 30 for the current virtual character, each surface of the particle distribution box 30 is divided into 3*3 grids, the particle distribution box is divided into sub distribution boxes, and each sub distribution box corresponds to a particle emitter. The current virtual character is located in the particle distribution box 30.

The edge position means that the current virtual character is located at the position corresponding to the edge layer sub distribution box of the particle distribution box. Referring to a left figure of FIG. 11, the edge position is a position corresponding to the nearest layer of sub distribution box 33, that is, a position corresponding to the layer of sub distribution box where the current virtual character 29 is located. The nearest layer of sub distribution box 33 is a layer of sub distribution box located in front of the field of view of the current virtual character and closest to the virtual character.

Step 52, move a layer of sub distribution box farthest from the current virtual character along the moving direction to a position in front of and adjacent to the nearest layer of sub distribution box. The nearest layer of sub distribution box is located in front of the field of view of the current virtual character and has the shortest distance from the current virtual character.

Referring to a left figure of FIG. 11, the moving process of the particle distribution box will be described from a top view. The current virtual character 29 is located at the edge position of the bounding range corresponding to the particle distribution box. The moving direction of the current virtual character is a direction indicated by the arrow. A layer of sub distribution box at a first position 31 is moved to a second position 32. The first position 31 is a position corresponding to a layer of sub distribution box farthest from the current virtual character, and the second position 32 is a position in front of and adjacent to the nearest layer of sub distribution box 33. The distance between the nearest layer of sub distribution box 33 and the current virtual character 29 is the shortest.

During the operation of the game application program, the particle distribution box is not displayed in the virtual environment screen, that is, the user cannot see the particle distribution box. FIG. 11 is only a schematic diagram.

In sum, in the method according to this embodiment, by setting the particle distribution box for the virtual character, in event that the virtual character moves to the preset position of the bounding range corresponding to the particle distribution box, the layer of sub distribution box farthest from the virtual character will move to the front of the field of view of the virtual character along the moving direction of the virtual character, so that the virtual character is always bounded by the particle distribution box, thus ensuring that the virtual character is always bounded by raindrops in the rain scene, and realizing the simulation of the real world. The particle emitter is recycled by moving the particle distribution box to improve the performance of the terminal when loading multiple particle emitters.

In an exemplary embodiment based on FIG. 5, the depth information of the shelter element in the virtual environment is used for blocking the raindrops to realize the simulation of the scene of people taking a shelter from rain under buildings in the real world, and the method for rendering weather in the virtual environment further includes the following steps:

Step 61, in event that the current virtual character is located in an indoor environment, acquire depth information of a shelter element. The depth information is obtained from a perspective of looking down at the virtual environment. The shelter element is used for providing the indoor environment for the current virtual character.

The game application program acquires the depth information of the shelter element from the perspective of locking down at the virtual environment, that is, the depth information of the shelter element is acquired by observing from the sky of the virtual environment to the ground of the virtual environment. The shelter element includes at least one of a house element, a hut element, a pavilion element, a bridge opening element, a tunnel element, and a straw shed element. The depth information of the shelter element is used for representing the distance between the highest point in the sky of the virtual environment (i.e., the highest point of the sky sphere model) and the shelter element. The depth information of the shelter element is stored in the weather system in advance in an off-line state.

The current virtual character can hide under the shelter to avoid raindrops in the virtual environment.

Step 62, delete part of the second raindrop map is according to the depth information of the shelter element and the depth information corresponding to the current virtual character. The part of the second raindrop map refers to the second raindrop map blocked by the shelter element in front of the field of view of the current virtual character.

The depth information corresponding to the current virtual character includes depth information corresponding to other virtual characters around the current virtual character, and depth information of a virtual element within a preset range around the current virtual character (the virtual element includes at least one of a shelter element, a plant element, and an animal element).

The process of using the shelter to shelter from raindrops will be described through the following three formulas:

Formula 1 is used for calculating the raindrop depth:

$$d = B \times d_{range} + (d_{base} + i \times d_{range}) \qquad \text{Formula 1}$$

where d represents the raindrop depth, B represents a parameter corresponding to the raindrop depth information stored in the B channel (blue channel) of the raindrop map, $d_{range}$ represents the depth range corresponding to the raindrop depth information, $d_{base}$ represents the base depth of the virtual element in the virtual environment, and i represents the raindrop map in the ith map layer.

The raindrop depth is calculated through the above formula, that is, the distance between the raindrop and the highest point in the sky of the virtual environment when the raindrops fall down to the ground from the perspective of looking down at the virtual environment.

Formula 2 is used for calculating the raindrop height:

$$h = k(d) \qquad \text{Formula 2}$$

where h represents the raindrop height, d represents the raindrop depth, and h=k (x) represents a functional relationship between the raindrop depth and the raindrop height.

The raindrop height represents the height that the raindrops fall down from the sky of the virtual environment.

Formula 3 is used for calculating the blocking result of raindrops:

$$g(x) = \begin{cases} 1, & d < d_{scene} \wedge h > h_{scene} \\ 0, & \text{otherwise} \end{cases} \qquad \text{Formula 3}$$

where d represents the raindrop depth, $d_{scene}$ represents the depth of the shelter element in the virtual environment, h represents the raindrop height, $h_{scene}$ represents the height of the shelter element in the virtual environment, 1 represents that the shelter element blocks the raindrops, and 0 represents that the raindrops are not blocked.

In event that the raindrop depth is less than the depth of the shelter element and the raindrop height is higher than the height of the shelter element in the virtual environment, part of the second raindrop map located in front of the field of view of virtual character is deleted, thus forming a phenomenon that the raindrops are "blocked" outside the shelter element.

In the real world, after a person enters the indoor environment, the indoor ground is in a dry state and the outdoor ground is in a wet state. The embodiment of this application simulates this situation in the virtual environment through the above formula.

Referring to FIG. 12(a), the current virtual character 29 is to move to the indoor environment, stands on a step to the building and faces the outdoor environment, and raindrops are displayed in front of the current virtual character 29.

Figure 12:
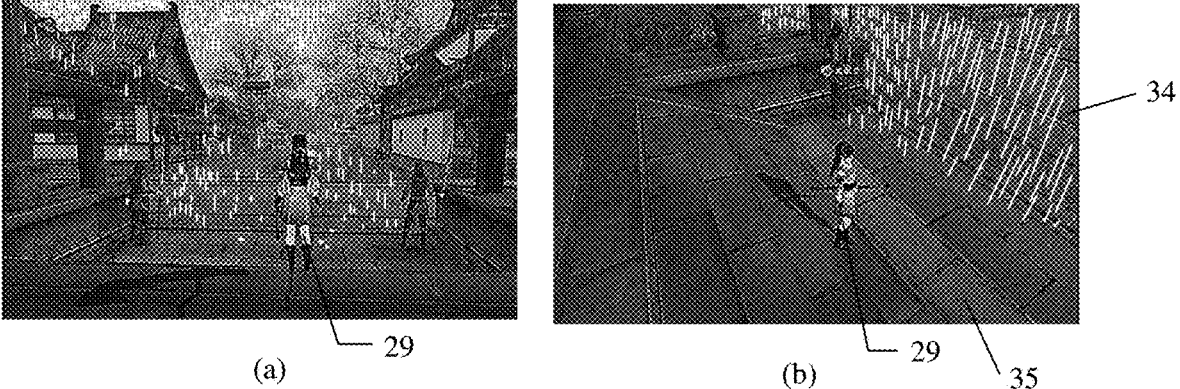
FIG. 12 is a screen diagram of a rain scene corresponding to a virtual environment screen according to an exemplary embodiment of this application.

Referring to FIG. 12(b), taking the side view as an example, the current virtual character 29 is standing on a step 35 belonging to the indoor environment, and the other side of the step 35 displays the water spray generated by the raindrops 34. The ground where the current virtual character 29 is standing is dry, and the ground on the other side of the step 35 is wet. When observing the virtual environment from the perspective of the user, the raindrop map is farthest from the user. The distance between the map corresponding to the step element (indoor environment) and the user is smaller than the distance between the raindrop map and the user. The map corresponding to the step element is used for blocking the raindrop map to achieve the effect illustrated in FIG. 12.

In sum, in the method according to this embodiment, in event that the virtual character is in the indoor environment, the position where the raindrop map appears in front of the virtual character is determined according to the depth information around the virtual character and the scene depth information of the rain scene, so that the raindrops are effectively blocked when the virtual character is in the indoor environment, thus realizing the simulation of the real world.

In an exemplary embodiment based on FIG. 5, raindrops falling on the ground of the virtual environment will generate water spray, and the method for rendering weather in the virtual environment further includes the following steps:

Step 71, acquire an initial position and a photographing position. The initial position is a position where water spray firstly appears on the ground of the virtual environment. The photographing position is a position where the camera model is located. The water spray is used for characterizing water spray generated in event that the raindrops fall down to the ground of the virtual environment.

The current virtual character corresponds to a camera model. Meshes are divided on the ground of the virtual environment. Each mesh corresponds to a water spray. The water spray is the water spray generated by raindrops splashing on the ground of the virtual environment. The position of the water spray is dynamically changed. The position of the water spray is updated by updating the position of the mesh. Constantly updating the position of the mesh will cause the performance consumption of the terminal and increase the surface temperature of the terminal. However, this embodiment uses the graphics processing unit to update the position of the water spray at a preset time interval, and let the position of the water spray follow the camera model to simulate the water spray effect in the rain scene. Therefore, the performance consumption of the terminal is reduced, thus preventing the surface temperature of the terminal from increasing.

Step 72, calculate an ith cycle position at the time of generating the water spray for an ith time according to the initial position and the photographing position, where i is a positive integer.

Formula 4 is used for calculating the ith cycle position at the time of generating the water spray for the ith time:

$$P_i = P_0 + P_{camera} \qquad \text{Formula 4}$$

where $P_0$ represents the initial position of a single water spray, $P_{camera}$ represents the photographing position of the camera model, and $P_i$ represents the water spray generated in the ith cycle.

Step 73, acquire a position offset parameter. The position offset parameter is used for representing an offset position when the water spray is cyclically generated.

Step 74, calculate an (i+1)th cycle position at the time of generating the water spray for an (i+1)th time according to the position offset parameter and the ith cycle position.

Formula 5 is used for calculating the (i+1)th cycle position at the time of generating the water spray for the (i+1)th time:

$$P_{i+1} = P_i + \frac{t_{total}}{t_{cycle}} \times \delta \qquad \text{Formula 5}$$

where $P_i$ represents the water spray generated in the ith cycle, $\delta$ represents the position offset parameter, $t_{total}$ represents the period of the start time of the game to the current time, and $t_{cycle}$ represents the time of one life cycle of the water spray, that is, the time from generation to disappearance of the water spray.

Step 75, repeat the operation of generating the cycle position of the water spray until the rain scene is switched.

Figure 13:
FIG. 13 is a schematic screen diagram of water spray generation in a virtual environment according to an exemplary embodiment of this application.

The calculation is repeated by using the above two formulas to obtain the cycle position of the water spray. Calculating the cycle position of the generated water spray is not stopped until the rain scene is switched to another scene. Referring to FIG. 13, it illustrates an effect diagram of the water spray rendered by adopting the method according to the embodiment of this application.

In sum, in the method according to this embodiment, the first cycle position of generating the ith water spray is calculated by acquiring the photographing position of the camera model and the initial position of the water spray in the virtual environment screen, so that the second cycle position of generating the (i+1)th water spray is calculated according to the first cycle position of the ith water spray, and the position offsetting is performed in the virtual environment by using a fixed number of water sprays, without requiring the terminal to generate new water sprays, thus improving the performance of the terminal when rendering the water spray in the rain scene.

Figure 14:
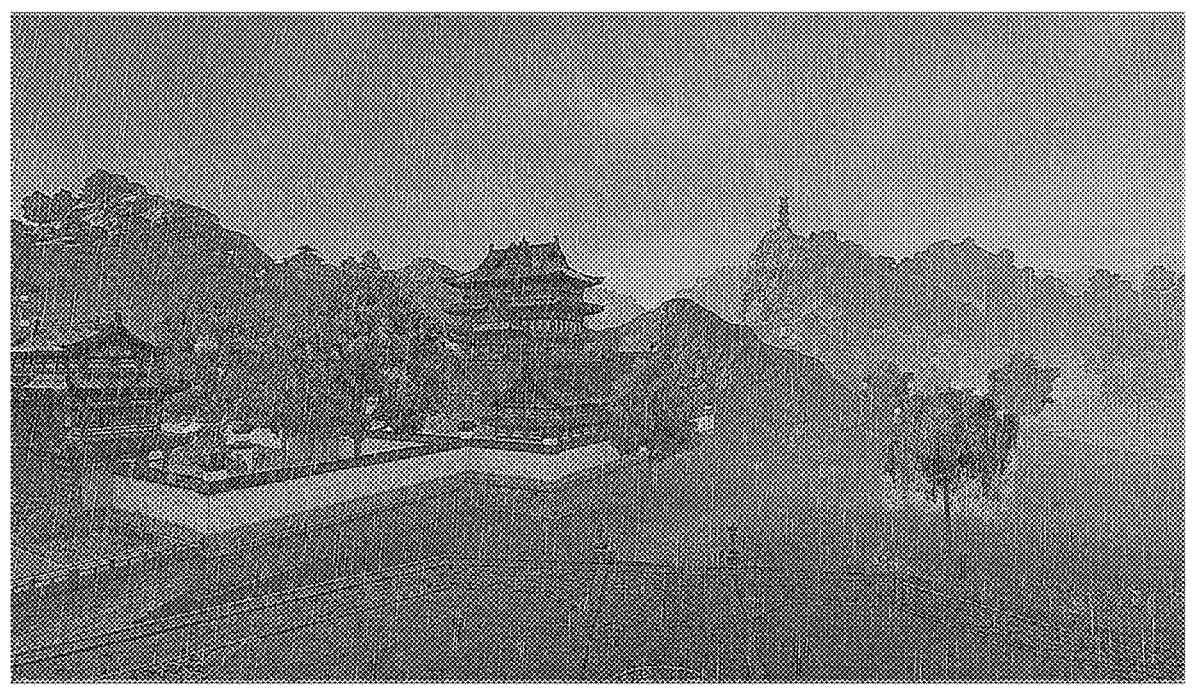
FIG. 14 is a screen diagram of a rain scene corresponding to a virtual environment screen according to another exemplary embodiment of this application.

Referring to FIG. 14, it illustrates an effect diagram of the rain scene in the virtual environment screen through raindrops rendered by adopting the method for rendering weather according to the embodiment of this application. The simulation of the real world is realized.

In addition, when the rain scene is rendered, the virtual environment screen is prone to a layering phenomenon. An area 47 in FIG. 15(*a*) indicates the layering phenomenon of raindrops in the virtual environment.

When the raindrop effect is rendered by adopting the method for rendering weather according to the embodiment of this application, the raindrop depth information stored in the channel of the second raindrop map is used for making the raindrops coherent without layering. When the game application program acquires the weather configuration information, the virtual environment screen is controlled to display the continuous raindrop effect, which is obtained after the rendering of the second raindrop map. The second raindrop map is obtained according to the weather configuration information and the weather correspondence (the method for acquiring the second raindrop map is described in the above embodiment and will not be repeatedly described here). The raindrop depth information is stored in the channel of the second raindrop map and represents the distance between the raindrop map and the virtual character.

The following two formulas are used for describing how to avoid the layering phenomenon of the raindrops:

Formula 6 is used for calculating the color of the raindrops on each layer of raindrop map:

$$f(x) = R \times g(x) \qquad \text{Formula 6}$$

where f (x) represents the color of the raindrops on each layer of raindrop map, R represents the raindrop shape information stored in the R channel (red channel) of the raindrop map, and g (x) represents the raindrop blocking result in Formula 3.

Formula 7 is used for calculating the rendering color of the raindrops:

$$C = \sum_{i=0}^{n} f(i) \qquad \text{Formula 7}$$

where C represents the rendering color of the raindrops, f (x) represents the color of the raindrops on each layer of raindrop map, i represents the raindrop map of the ith map layer, and n represents n layers of raindrop maps.

The color of the raindrops on each layer of raindrop map is calculated by using the raindrop blocking result calculated in Formula 3 and the raindrop shape information stored in the R channel of the raindrop map. The color of the raindrops on each layer of raindrop map is accumulated through Formula 7, so that the overall color of the raindrops in the final virtual environment screen tends to be consistent, thus avoiding the layer phenomenon of the raindrops, as illustrated in FIG. 15(*b*).

The above method embodiments regarding the raindrop effect may be implemented separately or jointly, which is not limited in the embodiments of this application.

2. Sky Light and Shadow Effect

FIG. 16 illustrates a flowchart of a method for rendering weather in a virtual environment according to another exemplary embodiment of this application. The method can be applied to the terminal 100 illustrated in FIG. 1. The terminal 100 is installed with a client corresponding to an application program that supports the operation of the virtual environment. The client runs based on the weather system 110. The method includes the following steps:

Step 1601, acquire weather configuration information. The weather configuration information is used for rendering the weather scene in the virtual environment.

For the implementation of step 1601, a reference may be made to the implementation of step 201 in the embodiment illustrated in FIG. 2 and the implementation of step 501 in the embodiment illustrated in FIG. 5, which will not be repeatedly described here.

Step 1602, acquire a second scattering map corresponding to the sky according to the weather configuration information.

The first scattering map is a scattering map at a sky height higher than a specified height in the virtual environment. The second scattering map is a scattering map at a sky height lower than or equal to a specified height in the virtual environment. The first scattering map does not include the second scattering map. Exemplarily, the sky height may be expressed in altitude, as illustrated in FIG. 4. A corresponding weather scene is calculated according to the weather configuration information and the weather correspondence, and a second scattering map is acquired according to the weather scene.

Step 1603, in event that the weather scene includes the sky light and shadow effect, process a second scattering map corresponding to the sky to obtain a processed rendering map. The resolution of the processed rendering map is lower than the resolution of the second scattering map.

Atmospheric scattering needs to be considered to simulate the sky light and shadow effect in the virtual environment. Atmospheric scattering is a phenomenon that light and atmospheric particles interact with each other to make incident energy redistributed in various directions with a certain law. In the embodiment of this application, the calculation data on light scattering is stored off line in a scattering map, and the scattering map is directly sampled during the game operation to optimize the efficiency during the operation. That is, the game application program calculates the scattering map of the sky in the virtual environment according to the weather correspondence and the weather configuration information, stores the scattering map off line in the graphics processing unit, and directly acquires the scattering map to load the sky in the virtual environment when the game application program runs.

Figure 17:
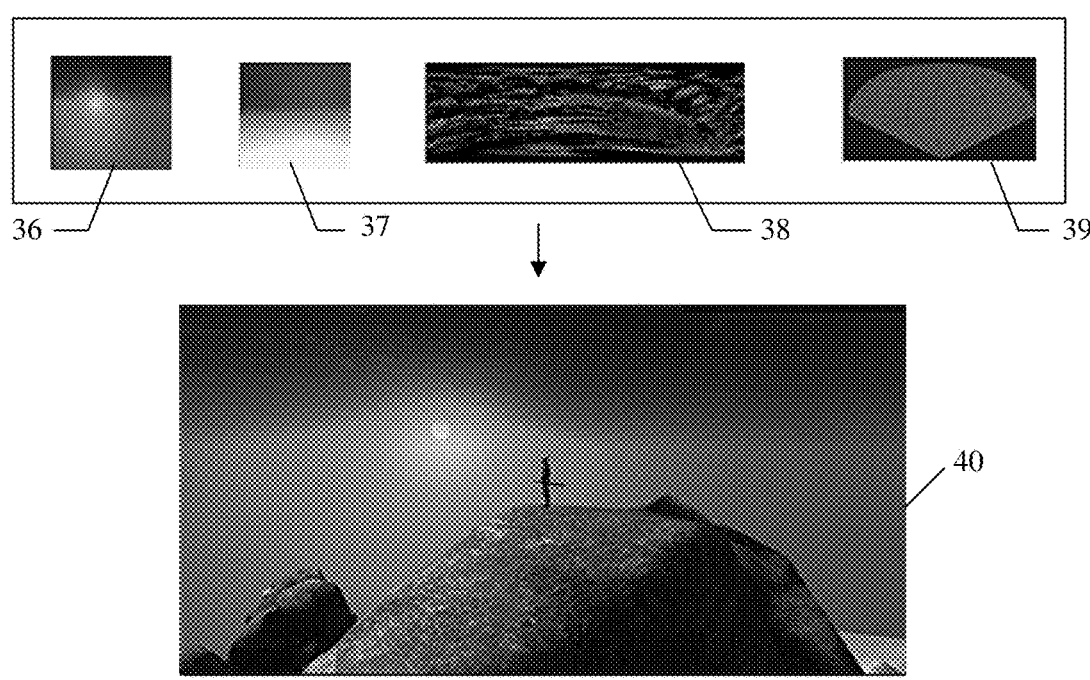
FIG. 17 is a schematic diagram of a scattering map corresponding to a sky according to an exemplary embodiment of this application.

In event that the atmospheric scattering effect is calculated from the two-dimensional scattering image, at least two times of scattering map sampling are required, and complex calculations are carried out for the light and shadow effect. Exemplarily, referring to FIG. 17, the embodiment of this application optimizes the calculation amount when rendering the sky. By rendering the scattering map of the sky part in the full-screen rendering screen 40 of the terminal to a rendering map 36 with a resolution of 64*64, compared to the resolution 1920*1080 of the full-screen rendering screen 40 (the resolution of the full screen rendering screen is related to the resolution of the terminal), the calculation amount of the embodiment of this application is reduced by about 500 times. During the rendering of the sky, the rendering map 36 corresponding to the sky is attached to a sky sphere model 39 to form a lighting scene corresponding to the rendered sky. In some embodiments, the rendered screen may also be enriched by attaching a cloud map 38 to the sky sphere model 39. The cloud map 38 can also be rendered to a lower resolution to reduce the calculation amount brought by the rendering process. In other embodiments, the rendered screen may also be enriched by attaching a fog map 37 to the sky sphere model 39. The fog map 37 can also be rendered to a lower resolution to reduce the calculation amount brought by the rendering process.

Step 1604, render a lighting scene corresponding to the sky of the virtual environment according to the processed rendering map.

Exemplarily, the lighting scene corresponding to the sky of the virtual environment is rendered through an atmospheric scattering model, and the lighting scene corresponding to the full-screen rendering screen 40 is obtained through the method according to the embodiment of this application.

Formula 8 is used for representing the rendering result of the atmospheric scattering model:

$$L(s, \theta) = L_0 F_{ex}(s) + L_{in}(s, \theta) \qquad \text{Formula 8}$$

where $L(s,\theta)$ represents the scattering result, $L_0$ represents the light intensity before entering an absorbing medium, $F_{ex}(s)$ represents transmittance, $L_{in}(s,\theta)$ represents inscattering result, and $\theta$ represents the scattering angle.

Formula 9 is used for representing transmittance:

$$F_{ex}(s) = e^{-(\beta_R + \beta_M)s} \qquad \text{Formula 9}$$

where $\beta_R$ represents Rayleigh scattering coefficient, $\beta_M$ represents Mie scattering coefficient, and s represents the distance from the target to the light source.

Formula 10 is used for representing the inscattering result:

$$L_{in}(s, \theta) = \frac{\beta_R(\theta) + \beta_M(\theta)}{\beta_R + \beta_M} E_{sun}\left(1 - e^{-(\beta_R + \beta_M)s}\right) \qquad \text{Formula 10}$$

where $\beta_R$ represents Rayleigh scattering coefficient, $\beta_M$ represents Mie scattering coefficient, s represents the distance from the target to the light source, $\theta$ represents the scattering angle, and $E_{sun}$ represents sunlight intensity.

Exemplarily, the embodiment of this application renders the fog scene through the atmospheric scattering model. In event that the atmospheric scattering model is called to render the fog, when calculating the inscattering result, the pixel points corresponding to the calculation results of Rayleigh scattering coefficient, Mie scattering coefficient and lighting intensity are rendered to a resolution of 64*64.

Figure 18:
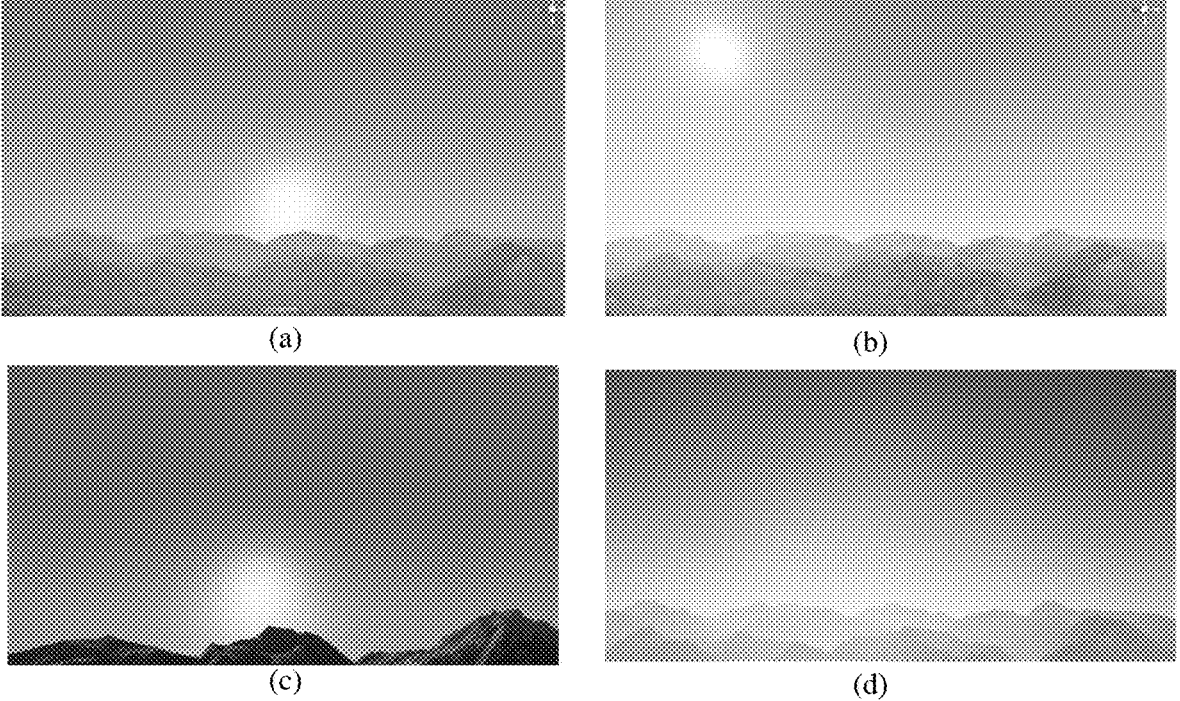
FIG. 18 is a schematic diagram of a sky rendering effect according to an exemplary embodiment of this application.

The rendered sky light and shadow effect obtained through the method according to the embodiment of this application is as illustrated in FIG. 18. FIG. 18 illustrates the sky in the virtual environment at each time period of the day, FIG. 18(*a*) illustrates the sky light and shadow effect corresponding to the virtual environment when the sun just rises. FIG. 18(*b*) illustrates the sky light and shadow effect corresponding to the virtual environment at the time period from morning to noon. FIG. 18(*c*) illustrates the sky light and shadow effect corresponding to the virtual environment when the sun is about to set. FIG. 18(*d*) illustrates the sky light and shadow effect corresponding to the virtual environment near night after the sun is completely set.

In sum, in the method according to this embodiment, by processing the scattering map into a rendering map with a lower resolution and simulating the lighting scene corresponding to the sky of the virtual environment through the rendering map with the lower resolution, the number of times of map sampling when the terminal runs application programs that support the virtual environment is reduced, thus preventing the performance of the terminal from being reduced.

3. Cloud Effect

FIG. 19 illustrates a flowchart of a method for rendering weather in a virtual environment according to another exemplary embodiment of this application. The method can be applied to the terminal 100 illustrated in FIG. 1. The terminal 100 is installed with a client corresponding to an application program that supports the operation of the virtual scene, and the client runs based on the weather system 110. The method includes the following steps:

Step 1901, in event that the weather scene includes a cloud effect, acquire at least two first texture cloud maps. The first texture cloud maps include two-dimensional cloud images with gray scales. The at least two first texture cloud maps are obtained after pixel points in a reference texture cloud map are offset along different directions. The reference texture cloud map includes two-dimensional cloud images under a non-lighting condition.

The terminal acquires weather configuration information, and acquires at least two first texture cloud maps based on the weather configuration information. The first texture cloud maps do not include three-dimensional cloud images with colors. The embodiment of this application realizes the rendering of clouds through a two-dimensional texture cloud map. The two-dimensional texture cloud map is an image with a gray scale. It is obtained through a reference texture cloud map stored in advance in the weather system. The reference texture cloud map is a two-dimensional cloud image with a cloud contour under a lighting condition, that is, a cloud image not influence by any lighting condition. The reference texture cloud map is an image with a gray scale.

Exemplarily, the reference texture cloud map is preprocessed through a ray marching algorithm to obtain the first texture cloud maps. Referring to FIG. 20, the process of the ray stepping algorithm is as follows: firstly, n rays (n is a positive integer) are emitted from the sun, and the rays have a sampling step size. When the rays are located in the clouds, a time of sampling is performed at each step to obtain the texture values of the clouds. White rectangle indicates that the texture value is a white value, and shaded rectangle indicates that the texture value is a gray value.

Figures 21, 22:
FIG. 21 is a schematic diagram of rendering of a texture cloud map according to another exemplary embodiment of this application.
FIG. 22 is a schematic diagram of a cloud rendering effect according to an exemplary embodiment of this application.

Exemplarily, the method for acquiring the first texture cloud maps is as illustrated in an upper figure of FIG. 21. The pixel points in the reference texture cloud map 41 are offset in leftward, rightward and upward directions. The offset steps in the three directions are equal, so a leftwards offset first texture cloud map 42, a rightwards offset first texture cloud map 43 and an upwards offset first texture cloud map 44 are obtained respectively.

Step 1902, mix the at least two first texture cloud maps according to weights corresponding to channels of the first texture cloud maps to obtain a second texture cloud map.

Exemplarily, the weight corresponding to the channel of the leftwards offset first texture cloud map 42 is 0.6, the weight corresponding to the channel of the rightwards offset first texture cloud map 43 is 0.3, and the weight corresponding to the channels of the rightwards offset first texture cloud map 43 and the upwards offset first texture cloud map 44 is 0.1. The three first texture cloud maps are rendered to obtain a rendered second texture cloud map 45 as illustrated in a lower figure of FIG. 21.

Step 1903, render clouds under light change according to the second texture cloud map.

The clouds under changing light 46 in the virtual environment are obtained by obtaining the second texture cloud map 45 as described above. The rendered cloud effect is as illustrated in FIG. 22.

In sum, in the method according to this embodiment, by preprocessing the two-dimensional texture cloud maps and mixing the first texture cloud maps according to the weights corresponding to the channels of the preprocessed first texture cloud maps, the mixed second texture cloud map is obtained, so that the terminal only needs to sample the two-dimensional texture cloud map once, thus reducing the energy consumption of the terminal.

The transition between time periods and between scenes in the virtual environment will be described below.

FIG. 23 illustrates a flowchart of a method for rendering weather in a virtual environment according to another exemplary embodiment of this application. The method can be applied to the terminal 100 illustrated in FIG. 1. The terminal 100 is installed with a client corresponding to an application program that supports the operation of the virtual environment. The client runs based on the weather system 110. The method includes the following steps:

Step 2301, acquire a first parameter, a second parameter, a third parameter and a fourth parameter. The first parameter is used for representing a map parameter corresponding to the first weather scene. The second parameter is used for representing a map parameter corresponding to the second weather scene. The third parameter is used for representing a corresponding transition coefficient during the switching of time period. The fourth parameter is used for representing a corresponding transition coefficient during the switching between the two weather scenes.

Time period refers to a set of all parameters that control the performance of the virtual environment at various time points in the day of the virtual environment.

Figure 24:
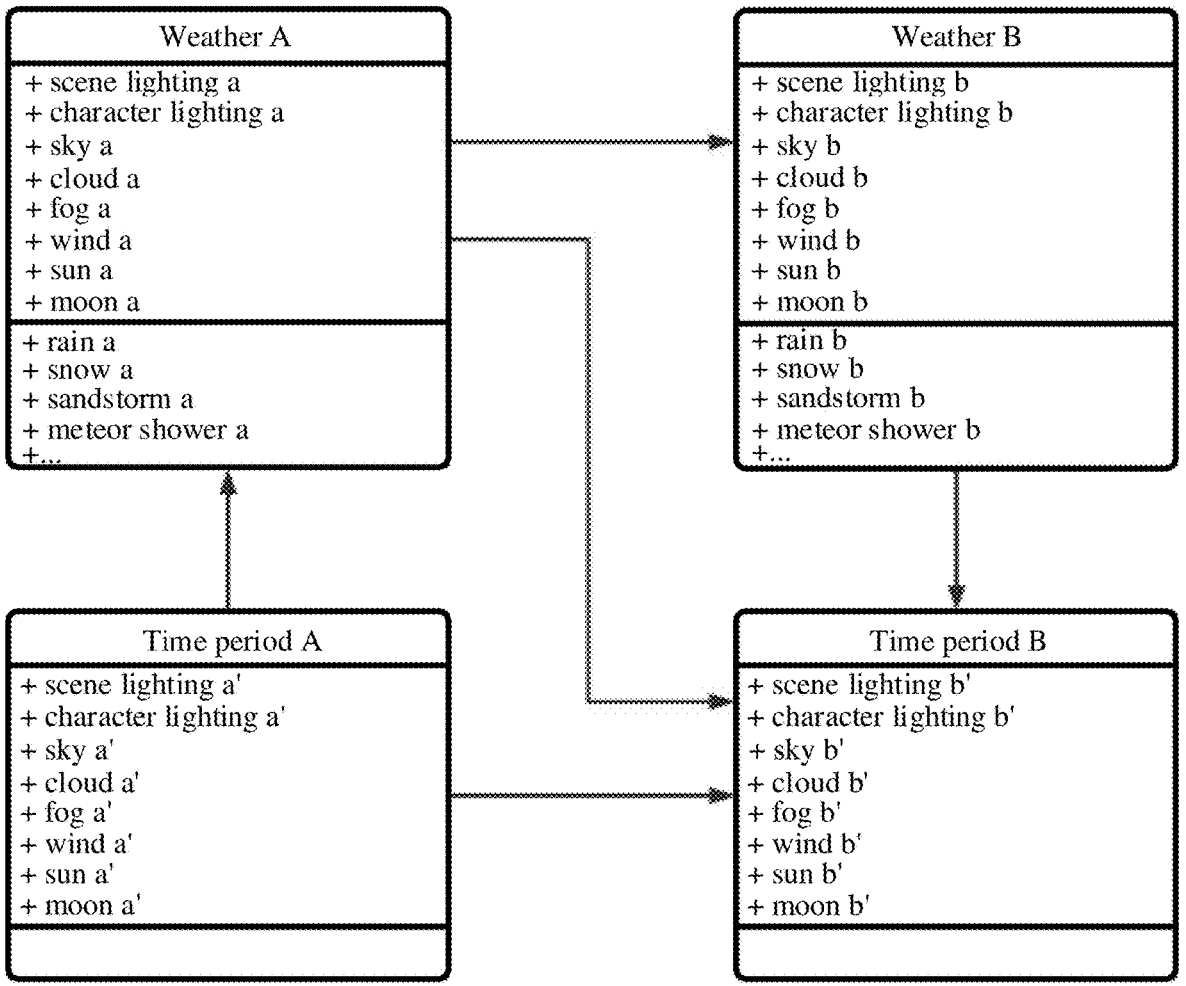
FIG. 24 is a block diagram of a weather scene transition process according to an exemplary embodiment of this application.

Referring to FIG. 24, the weather scene in the virtual environment is associated with the time period, that is, when the time in the virtual environment is switched from time period A to time period B, the weather scene is also switched from the weather scene corresponding to time period A to the weather scene corresponding to time period B. For example, in event that the weather scene of the virtual environment is a sunny day, a linear transition is made between adjacent time periods. In event that the weather exists, the adjacent time periods and the weather are transitioned together. The weather switching firstly involves the change of environmental elements, and then the switching of the weather scene. For example, the rainy scene is that the sky darkens firstly and then it begins to rain. Smooth transition can be achieved between time periods, between time periods and weather scenes, and between weather scenes.

Step 2302, obtain a corresponding screen rendering parameter during the switching between the weather scenes according to the first parameter, the second parameter, the third parameter and the fourth parameter.

Step 2303, render a transition screen when the first weather scene is switched to the second weather scene according to the screen rendering parameter.

Formula 11 is used for calculating the screen rendering parameter:

$$d = (d_1 \times \theta + d_2 \times (1 - \theta) \times \beta) + d_3 \times (1 - \beta) \qquad \text{Formula 11}$$

where d represents the screen rendering parameter, $d_1$ represents the map parameter corresponding to the first weather scene (or the first time period), $d_2$ represents the map parameter corresponding to the second weather scene (or the second time period), $d_3$ represents the map parameter corresponding to the second weather scene, $\beta$ represents the corresponding transition coefficient during the switching between two weather scenes, the value range of $\beta$ is 0-1, 1 indicates that the weather scene is not changed (one weather scene is unchanged), 0 indicates that the weather scene is changed (switching between two weather scenes), $\theta$ represents the corresponding transition coefficient during the switching of the time period, the value range of $\theta$ is 0-1, 0 indicates the night time period, and 1 indicates the day time period.

Description will be made by taking that the time period from 6:00 AM to 6:00 PM in the virtual environment is the day time period and the time period from 6:00 PM to 6:00 AM of the next day is the night time period as an example. In one example, the day time period transitions to the night time period. In event that the current time of the virtual environment is 6:00 AM, $\theta=1$, then the value of $d_2 \times (1-\theta) \times \beta$ is 0. In event that the weather scene does not change, then $\beta=1$, the value of $d_3 \times (1-\beta)$ is 0, and the screen rendering parameter is $d=d_1 \times \theta$, which corresponds to the day time scene. As the time of the virtual environment screen changes, the value of $\theta$ changes from 1 to 0. During this period, in event that the weather scene changes, the value of $\beta$ changes. In event that the weather scene does not change, then the value of $\beta$ does not change. In event that the current time of the virtual environment is 7:00 PM, $\theta=0$, then the value of $d_1 \times \theta$ is 0. In event that the weather scene does not change, then $\beta=1$, the value of $d_3 \times (1-\beta)$ is 0, and the screen rendering parameter is $d=d_2 \times (1-\theta)$, which corresponds to the night scene.

Since the values of $\theta$ and $\beta$ change, the screen rendering parameter corresponding to any time period can be calculated, so that the virtual environment smoothly transitions from the scene corresponding to the day time period to the scene corresponding to the night time period.

In another example, the sunny scene (the first weather scene) transitions to the rainy scene (the second weather scene). The current time period of the virtual environment is the day time period, and the current weather scene is the sunny scene, then $\theta=1$, $\beta=1$, and the screen rendering parameter is $d=d_1 \times \theta$. In event that the virtual environment starts to rain at 12:00, then $\theta=1$, $\beta=0$, and the screen rendering parameter is $d=d_1 \times \theta+d_3$, which corresponds to the rain scene.

Since the values of $\theta$ and $\beta$ change, the screen rendering parameter corresponding to any time period can be calculated, and the screen rendering parameter corresponding to the change of the weather scene at a certain time period can also be calculated. Therefore, the screen of the virtual environment can smoothly transition during the switching of the scene between the time periods, and can also smoothly transition during the switching between any two weather scenes.

Step 2303 may be replaced with the following steps:
Step S1, update and calculate the screen rendering parameter is at a preset time interval.
Step S2, render a transition screen in event that the first weather scene is switched to the second weather scene according to the screen rendering parameter.

On the premise of ensuring the natural transition, the weather transition is optimized every other frame. In event that Frames Per Second (FPS) is 30, only 15 update calculations are required per second, so that the weather system consumes less terminal performance. Exemplarily, two scene maps need to be sampled in the time period switching process to reduce the terminal performance consumed by the weather system by means of inter-frame optimization. Therefore, smooth transition can be realized for the switching between weather scenes in the virtual environment.

In sum, in the method according to this embodiment, the screen rendering parameter during the switching of the weather scene is calculated through the first parameter, the second parameter, the third parameter and the fourth parameter, and the screen is rendered according to the screen rendering parameter, so that the weather scene of the virtual environment can smoothly transition between any weather scenes or any time periods, thus ensuring the smoothness of the screen displayed.

The screen rendering parameter is updated once at a preset time interval, thus preventing the performance of the terminal from being reduced when loading the virtual environment screen due to frequent update calculation of the screen rendering parameter.

The above method embodiments regarding the raindrop effect, the sky light and shadow effect, the cloud effect and the transition effect may be implemented separately or jointly, which is not limited in the embodiments of this application.

Figures 25, 26:
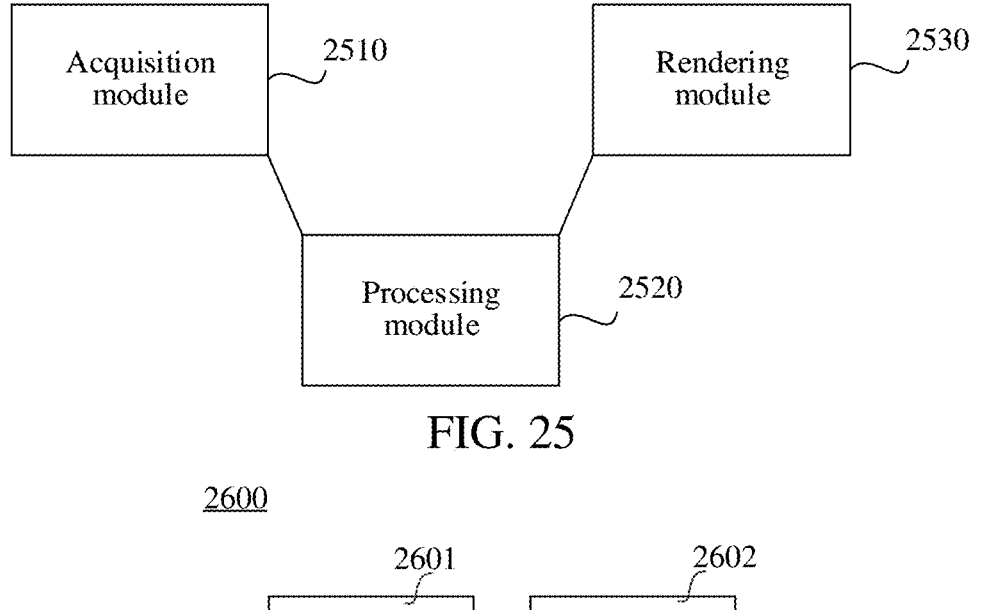
FIG. 25 is a block diagram of an apparatus for rendering weather in a virtual environment according to an exemplary embodiment of this application.
FIG. 26 is a schematic structural diagram of a computer device according to an exemplary embodiment of this application.

FIG. 25 illustrates a schematic structural diagram of an apparatus for rendering weather in a virtual environment according to an exemplary embodiment of this application. The apparatus may be implemented as an entire terminal or a part of a terminal by using software, hardware, or a combination thereof. The apparatus includes:

an acquisition module 2510 configured to acquire at least one weather map of a weather scene in the virtual environment;

a processing module 2520 configured to remove a first weather map from the at least one weather map to obtain a remaining second weather map, the first weather map including a weather map outside the field of view of a current virtual character in the virtual environment;

a rendering module 2530 configured to render the weather scene in the virtual environment according to the second weather map.

In an exemplary embodiment, the first weather map includes at least one of the following maps:

when the weather scene includes a raindrop effect, the first weather map includes a first raindrop map in front of the field of view of the current virtual character and beyond a preset distance of the current virtual character;

when the weather scene includes a sky light and shadow effect, the first weather map includes a first scattering map at a sky height higher than a specified height, and the first scattering map is an image for representing a light scattering effect in the sky.

In an exemplary embodiment, the acquisition module 2510 is configured to, when the weather scene includes the raindrop effect, acquire a map layer divided in the line of sight direction of the current virtual character;

the processing module 2520 is configured to add a second raindrop map into the map layer, the second raindrop map includes a raindrop map in front of the field of view of the current virtual character and within the preset distance of the current virtual character, raindrop depth information is stored in a channel of the second raindrop map, the raindrop depth information is used for representing the distance between the current virtual character and the second raindrop map, and a positive correlation is included between the raindrop depth information and raindrop size;

the rendering module 2530 is configured to render raindrops with the raindrop size matching the raindrop depth information in the rain scene.

In an exemplary embodiment, the acquisition module 2510 is configured to, when the current virtual character is located in an indoor environment, acquire depth information of a shelter element, the depth information is obtained from a perspective of looking down at the virtual environment, and the shelter element is used for providing the indoor environment for the current virtual character;

the processing module 2520 is configured to delete part of the second raindrop map according to the depth information of the shelter element and the depth information corresponding to the current virtual character, and the part of the second raindrop map refers to the second raindrop map blocked by the shelter element in front of the field of view of the current virtual character.

In an exemplary embodiment, the current virtual character corresponds to a camera model;

the acquisition module 2510 is configured to acquire an initial position and a photographing position, the initial position is a position where water spray firstly appears on the ground of the virtual environment, the photographing position is a position where the camera model is located, and the water spray is used for characterizing water spray generated when the raindrops fall down to the ground of the virtual environment;

the processing module 2520 is configured to calculate an ith cycle position at the time of generating the water spray for the ith time according to the initial position and the photographing position, and i is a positive integer;

the acquisition module 2510 is configured to acquire a position offset parameter, and the position offset parameter is used for representing an offset position when the water spray is cyclically generated;

the processing module 2520 is configured to calculate an (i+1)th cycle position at the time of generating the water spray for the (i+1)th time according to the position offset parameter and the ith cycle position; repeat the operation of generating the cycle position of the water spray until the rain scene is switched.

In an exemplary embodiment, the processing module 2520 is configured to, when the weather scene includes the sky light and shadow effect, process a second scattering map corresponding to the sky to obtain a processed rendering map, the resolution of the processed rendering map is lower than the resolution of the second scattering map, and the second scattering map includes a scattering map at a sky height lower than a specified height;

the rendering module 2530 is configured to render a lighting scene corresponding to the sky of the virtual environment according to the processed rendering map.

In an exemplary embodiment, the acquisition module 2510 is configured to, when the weather scene includes a cloud effect, acquire at least two first texture cloud maps, the first texture cloud maps include two-dimensional cloud images with gray scales, the at least two first texture cloud maps are obtained after pixel points in a reference texture cloud map are offset along different directions, and the reference texture cloud map includes two-dimensional cloud images under a non-lighting condition;

the processing module 2520 is configured to mix the at least two first texture cloud maps according to weights corresponding to channels of the first texture cloud maps to obtain a second texture cloud map;

the rendering module 2530 is configured to render clouds under changing light according to the second texture cloud map.

In an exemplary embodiment, the current virtual character corresponds to a particle distribution box, the particle distribution box is divided into m*n sub distribution boxes, the current virtual character is located in the particle distribution box, m and n are positive integers, each sub distribution box corresponds to a particle emitter, and the particle distribution box is configured to simulate the weather scene represented by particles through the particle emitter;

the acquisition module 2510 is configured to, when the current virtual character moves to an edge position of a bounding range corresponding to the particle distribution box, acquire a moving direction of the current virtual character;

the processing module 2520 is configured to move a layer of sub distribution box farthest from the current virtual character along the moving direction to a position in front of and adjacent to the nearest layer of sub distribution box, and the nearest layer of sub distribution box is located in front of the field of view of the current virtual character and has the shortest distance from the current virtual character.

In an exemplary embodiment, the acquisition module 2510 is configured to acquire a first parameter, a second parameter, a third parameter and a fourth parameter are acquired, the first parameter is used for representing a map parameter corresponding to the first weather scene, the second parameter is used for representing a map parameter corresponding to the second weather scene, the third parameter is used for representing a corresponding transition coefficient during the switching of time period, and the fourth parameter is used for representing a corresponding transition coefficient during the switching between the two weather scenes.

the processing module 2520 is configured to obtain a corresponding screen rendering parameter during the switching between the weather scenes according to the first parameter, the second parameter, the third parameter and the fourth parameter; render a transition screen when the first weather scene is switched to the second weather scene according to the screen rendering parameter.

In an exemplary embodiment, the processing module 2520 is configured to update and calculate the screen rendering parameter at a preset time interval; and the rendering module 2520 is configured to render a transition screen when the first weather scene is switched to the second weather scene according to the screen rendering parameter.

FIG. 26 illustrates a structural block diagram of a computer device 2600 according to an exemplary embodiment of this application. The computer device 2600 may be a portable mobile terminal, such as a smartphone, a tablet computer, a moving picture experts group audio layer III (MP3) player, or a moving picture experts group audio layer (MP4) player. The computer device 2600 may be further referred to as another name such as user equipment or a portable terminal.

Generally, the computer device 2600 includes a processor 2601 and a memory 2602.

The processor 2601 may include one or more processing cores, such as a 4-core processor or an 8-core processor. The processor 2601 may be implemented by at least one hardware form in a digital signal processing (DSP), a field-programmable gate array (FPGA), and a programmable logic array (PLA). The processor 2601 may also include a main processor and a coprocessor. The main processor is a processor for processing data in a wake-up state, also referred to as a central processing unit (CPU). the coprocessor is a low-power processor configured to process data in a standby state. In some embodiments, the processor 2601 may be integrated with a graphics processing unit (GPU). The GPU is configured to render and draw content that needs to be displayed on a display screen. In some embodiments, the processor 2601 may further include an artificial intelligence (AI) processor. The AI processor is configured to process a computing operation related to machine learning.

The memory 2602 may include one or more computer-readable storage media. The computer-readable storage medium may be tangible and non-transient. The memory 2602 may also include a high-speed random access memory, as well as non-volatile memory, such as one or more disk storage devices and flash storage devices. In some embodiments, the non-transitory computer-readable storage medium in the memory 2602 is configured to store at least one instruction, and the at least one instruction is configured to be executed by the processor 2601 to implement the method for rendering weather in a virtual environment provided in the embodiments of this application.

A person skilled in the art may understand that the structure shown in FIG. 26 does not constitute any limitation on the computer device 2600, and the computer device may include more components or fewer components than those shown in the figure, or some components may be combined, or a different component deployment may be used.

The embodiments of this application further provide a computer device. The computer device includes processor and a memory. The memory stores at least one instruction, at least one program, a code set, or an instruction set. The at least one instruction, the at least one program, the code set, or the instruction set is loaded and executed by the processor to implement the method for rendering weather in a virtual environment according to the foregoing method embodiments.

The embodiments of this application further provide a computer-readable storage medium, storing at least one instruction, at least one program, a code set or an instruction set, the at least one instruction, the at least one program, the code set or the instruction set being loaded and executed by a processor to implement the method for rendering weather in a virtual environment according to the foregoing method embodiments.

An embodiment of this application further provides a computer program product or a computer program, the computer program product or the computer program including computer instructions, the computer instructions being stored in a computer-readable storage medium. A processor of the computer device reads the computer instructions from the computer-readable storage medium and executes the computer instructions to cause the computer device to perform the method for rendering weather in a virtual environment described in the foregoing aspects.

28

What is claimed is:

1. A method for rendering weather in a virtual environment, applied to a computer device, the method comprising:

acquiring at least two weather maps of a weather scene in the virtual environment, the at least two weather maps representing the weather scene in multiple dimensions;

removing, in response to a first weather map from the at least two weather maps comprising a weather map outside a field of view of a current virtual character in the virtual environment, the first weather map from the at least two weather maps so that a second weather map of the same weather scene remains, wherein removing the first weather map is configured to reduce a frequency of map sampling, and wherein the weather map outside the field of view of the current virtual character comprises:

a first raindrop map in front of the field of view of the current virtual character but beyond a preset distance of the current virtual character when the weather scene comprises a raindrop effect; or a first scattering map at a sky height higher than a specified height, and the first scattering map being an image representing a light scattering effect in a sky in the virtual environment, when the weather scene comprises a sky light and shadow effect; and rendering the weather scene according to the second weather map.

2. The method according to claim 1, wherein the rendering the weather scene according to the second weather map comprises:

when the weather scene comprises the raindrop effect, acquiring a map layer divided in a line of sight direction of the current virtual character;

adding a second raindrop map into the map layer, the second raindrop map comprising a raindrop map in front of the field of view of the current virtual character and within the preset distance of the current virtual character, raindrop depth information being stored in a channel of the second raindrop map, the raindrop depth information used to represent a distance between the current virtual character and the second raindrop map, a positive correlation being comprised between the raindrop depth information and raindrop size; and rendering raindrops with the raindrop size matching the raindrop depth information in a rain scene.

3. The method according to claim 2, the method further comprising:

when the current virtual character is located in an indoor environment, acquiring depth information of a shelter element, the depth information obtained from a perspective of looking down at the virtual environment, the shelter element used to provide the indoor environment for the current virtual character; and deleting part of the second raindrop map according to the depth information of the shelter element and depth information corresponding to the current virtual character, the part of the second raindrop map referring to the second raindrop map blocked by the shelter element in front of the field of view of the current virtual character.

4. The method according to claim 2, wherein the current virtual character corresponds to a camera model;

the method further comprising:

acquiring an initial position and a photographing position, the initial position being a position where a water spray firstly appears on a ground of the virtual environment, the photographing position being a position where the camera model is located, the water spray used to characterize water spray generated when the raindrops fall down to the ground of the virtual environment;

calculating an ith cycle position at a time of generating the water spray for an ith time according to the initial position and the photographing position, i being a positive integer;

acquiring a position offset parameter, the position offset parameter used to represent an offset position when the water spray is cyclically generated;

calculating an (i+1)th cycle position at the time of generating the water spray for an (i+1)th time according to the position offset parameter and the ith cycle position; and repeating operations of generating cycle position of the water spray until the rain scene is switched.

5. The method according to claim 1, wherein the rendering the weather scene according to the second weather map comprises:

when the weather scene comprises the sky light and shadow effect, processing a second scattering map corresponding to the sky to obtain a processed rendering map, a resolution of the processed rendering map being lower than a resolution of the second scattering map, the second scattering map comprising a scattering map at a sky height lower than a specified height; and rendering a lighting scene corresponding to the sky of the virtual environment according to the processed rendering map.

6. The method according to claim 1, the method further comprising:

when the weather scene comprises a cloud effect, acquiring at least two first texture cloud maps, the first texture cloud maps comprising two-dimensional cloud images with gray scales, the at least two first texture cloud maps obtained after pixel points in a reference texture cloud map are offset along different directions, the reference texture cloud map comprising two-dimensional cloud images under a non-lighting condition;

mixing the at least two first texture cloud maps according to weights corresponding to channels of the first texture cloud maps to obtain a second texture cloud map; and rendering clouds under changing light according to the second texture cloud map.

7. The method according to claim 1, wherein the current virtual character corresponds to a particle distribution box, the particle distribution box is divided into m*n sub distribution boxes, the current virtual character is located in the particle distribution box, m and n are positive integers, each sub distribution box corresponds to a particle emitter, and the particle distribution box is configured to simulate the weather scene represented by particles through the particle emitter;

the method further comprising:

when the current virtual character moves to an edge position of a bounding range corresponding to the particle distribution box, acquiring a moving direction of the current virtual character; and moving a layer of sub distribution box farthest from the current virtual character along the moving direction to a position in front of and adjacent to a nearest layer of sub distribution box, the nearest layer of sub distribution box being located in front of the field of view of the current virtual character and having a shortest distance from the current virtual character.

8. The method according to claim 1, the method further comprising:

acquiring a first parameter, a second parameter, a third parameter and a fourth parameter, the first parameter used to represent a map parameter corresponding to a first weather scene, the second parameter used to represent a map parameter corresponding to a second weather scene, the third parameter used to represent a corresponding transition coefficient during a switching of time period, the fourth parameter used to represent a corresponding transition coefficient during the switching between two weather scenes;

obtaining a corresponding screen rendering parameter during the switching between the weather scenes according to the first parameter, the second parameter, the third parameter and the fourth parameter; and rendering a transition screen when first weather scene is switched to the second weather scene according to the corresponding screen rendering parameter.

9. The method according to claim 8, wherein the rendering a transition screen when the first weather scene is switched to the second weather scene according to the corresponding screen rendering parameter comprises:

updating and calculating the corresponding screen rendering parameter at a preset time interval; and rendering the transition screen when the first weather scene is switched to the second weather scene according to the corresponding screen rendering parameter.

10. An apparatus for rendering weather in a virtual environment, the apparatus comprising:

a memory storing a plurality of instructions; and a processor configured to execute the plurality of instructions, and upon execution of the plurality of instructions, is configured to:

acquire at least two weather maps of a weather scene in the virtual environment, the at least two weather maps representing the weather scene in multiple dimensions;

remove, in response to a first weather map from the at least two weather maps comprising a weather map outside a field of view of a current virtual character in the virtual environment, the first weather map from the at least two weather maps so that a second weather map of the same weather scene remains, wherein removing a first weather map is configured to reduce a frequency of map sampling, and wherein the weather map outside the field of view of the current virtual character comprises:

a first raindrop map in front of the field of view of the current virtual character but beyond a preset distance of the current virtual character when the weather scene comprises a raindrop effect; or a first scattering map at a sky height higher than a specified height, and the first scattering map being an image representing a light scattering effect in a sky in the virtual environment, when the weather scene comprises a sky light and shadow effect; and render the weather scene according to the second weather map.

11. The apparatus according to claim 10, wherein the processor, upon execution of the plurality of instructions, is further configured to:

when the weather scene comprises the raindrop effect, acquire a map layer divided in a line of sight direction of the current virtual character;

add a second raindrop map into the map layer, the second raindrop map comprising a raindrop map in front of the field of view of the current virtual character and within the preset distance of the current virtual character, raindrop depth information being stored in a channel of the second raindrop map, the raindrop depth information used to represent a distance between the current virtual character and the second raindrop map, a positive correlation being comprised between the raindrop depth information and raindrop size; and render raindrops with the raindrop size matching the raindrop depth information in a rain scene.

12. The apparatus according to claim 11, wherein the plurality of instructions, upon execution of the plurality of instructions, is further configured to:

when the current virtual character is located in an indoor environment, acquire depth information of a shelter element, the depth information obtained from a perspective of looking down at the virtual environment, the shelter element used to provide the indoor environment for the current virtual character; and delete part of the second raindrop map according to the depth information of the shelter element and depth information corresponding to the current virtual character, the part of the second raindrop map referring to the second raindrop map blocked by the shelter element in front of the field of view of the current virtual character.

13. The apparatus according to claim 11, wherein the current virtual character corresponds to a camera model;

acquire an initial position and a photographing position, the initial position being a position where a water spray firstly appears on a ground of the virtual environment, the photographing position being a position where the camera model is located, the water spray used to characterize water spray generated when the raindrops fall down to the ground of the virtual environment;

calculate an ith cycle position at a time of generating the water spray for an ith time according to the initial position and the photographing position, i being a positive integer;

acquire a position offset parameter, the position offset parameter used to represent an offset position when the water spray is cyclically generated;

calculate an (i+1)th cycle position at the time of generating the water spray for an (i+1)th time according to the position offset parameter and the ith cycle position, and repeat generation of cycle position of the water spray until the rain scene is switched.

14. The apparatus according to claim 10, wherein the processor, upon execution of the plurality of instructions, is further configured to:

when the weather scene comprises the sky light and shadow effect, process a second scattering map corresponding to the sky to obtain a processed rendering map, a resolution of the processed rendering map being lower than a resolution of the second scattering map, the second scattering map comprising a scattering map at a sky height lower than a specified height; and render a lighting scene corresponding to the sky of the virtual environment according to the processed rendering map.

15. The apparatus according to claim 10, wherein the processor, upon execution of the plurality of instructions, is further configured to:

when the weather scene comprises a cloud effect, acquire at least two first texture cloud maps, the first texture cloud maps comprising two-dimensional cloud images with gray scales, the at least two first texture cloud maps being obtained after pixel points in a reference texture cloud map are offset along different directions, the reference texture cloud map comprising two-dimensional cloud images under a non-lighting condition;

mix the at least two first texture cloud maps according to weights corresponding to channels of the first texture cloud maps to obtain a second texture cloud map; and render clouds under changing light according to the second texture cloud map.

16. A non-transitory computer readable storage medium storing a plurality of instructions executable by a processor, wherein the plurality of instructions, upon execution by the processor, is configured to cause the processor to:

acquire at least two weather maps of a weather scene in a virtual environment, the at least two weather maps representing the weather scene in multiple dimensions, the at least two weather maps representing the weather scene in multiple dimensions;

remove, in response to a first weather map from the at least two weather maps comprising a weather map outside a field of view of a current virtual character in the virtual environment, the first weather map from the at least two weather maps so that a second weather map of the same weather scene remains, wherein removing a first weather map is configured to reduce a frequency of map sampling, and wherein the weather map outside the field of view of the current virtual character comprises:

a first raindrop map in front of the field of view of the current virtual character but beyond a preset distance of the current virtual character when the weather scene comprises a raindrop effect; or a first scattering map at a sky height higher than a specified height, and the first scattering map being an image representing a light scattering effect in a sky in the virtual environment, when the weather scene comprises a sky light and shadow effect; and render the weather scene according to the second weather map.

17. The non-transitory computer readable storage medium according to claim 16, the plurality of instructions, upon execution by the processor, is further configured to cause the processor to:

when the weather scene comprises a cloud effect, acquire at least two first texture cloud maps, the first texture cloud maps comprising two-dimensional cloud images with gray scales, the at least two first texture cloud maps being obtained after pixel points in a reference texture cloud map are offset along different directions, the reference texture cloud map comprising two-dimensional cloud images under a non-lighting condition;

mix the at least two first texture cloud maps according to weights corresponding to channels of the first texture cloud maps to obtain a second texture cloud map; and render clouds under changing light according to the second texture cloud map.

* * * * *